United States Patent [19]

Tomlinson et al.

[11] Patent Number: 5,047,845

[45] Date of Patent: Sep. 10, 1991

[54] CHARGE-TRANSFER-DEVICE PLANAR ARRAY FOR DETECTING COHERENT-LIGHT PHASE

[75] Inventors: Harold W. Tomlinson, Scotia; Gerald J. Michon, Waterford, both of N.Y.

[73] Assignee: General Electric Company, Schenectady, N.Y.

[21] Appl. No.: 594,507

[22] Filed: Oct. 9, 1990

[51] Int. Cl.$^5$ .............................................. H04N 13/00
[52] U.S. Cl. ............................................. 358/90; 358/2; 358/213.23; 364/724.01; 356/28.5; 359/1; 359/3
[58] Field of Search ............ 358/2, 90, 213.23, 213.12, 358/213.11, 213.29; 364/724.01; 350/3.61, 3.6, 3.82; 356/28.5

[56] References Cited

U.S. PATENT DOCUMENTS

| | | | |
|---|---|---|---|
| 4,780,605 | 10/1988 | Tiemann | 358/213.23 |
| 4,811,409 | 3/1989 | Cavan | 358/101 |
| 4,974,920 | 12/1990 | Chovan | 350/3.61 |

Primary Examiner—Howard W. Britton
Assistant Examiner—Sherrie Hsia
Attorney, Agent, or Firm—Allen L. Limberg; James C. Davis, Jr.; Marvin Snyder

[57] ABSTRACT

Respective processors for pairs of photodetecting elements are included in an imager used for sensing hologram fringe patterns in an optical interferometer. These processors remove the direct-current pedestal from in-phase and quadrature-phase field images, then perform partial correlations of the resulting field images on a pixel-by-pixel basis, and then sum the partial correlations to complete the image correlation process and to provide imager output signal or the basis therefor. This localized processing greatly reduces the number of samples that have to be brought out of the imager each frame when the imager is used in an optical interferometer to detect phase modulation in an optical signal, allowing for increased frame rates in accordance with a further aspect of the invention. Image correlation is done according to a novel algorithm that avoids actually having to multiply together correspondingly located pixels in each pair of successive fields forming a successive non-overlapping frame. The multiplier-free processors are compact enough to be located within the solid state imager close to the pairs of photosensors they respectively serve in the imager.

13 Claims, 23 Drawing Sheets

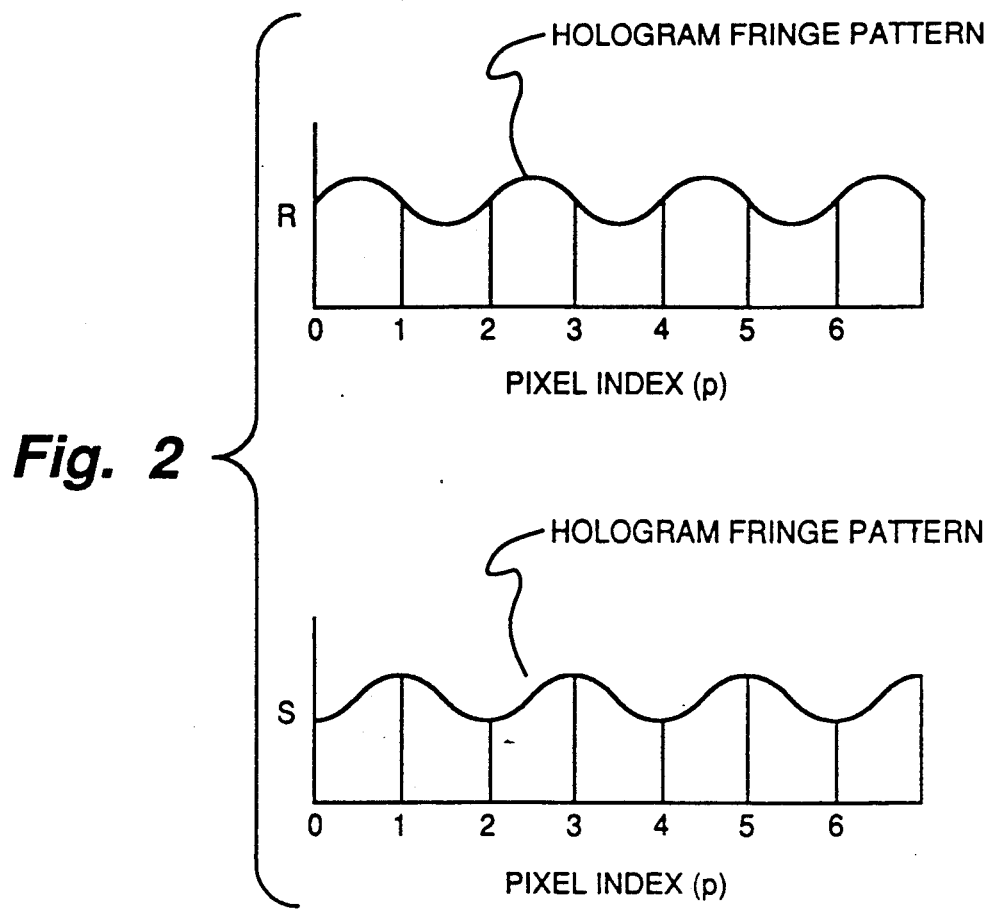
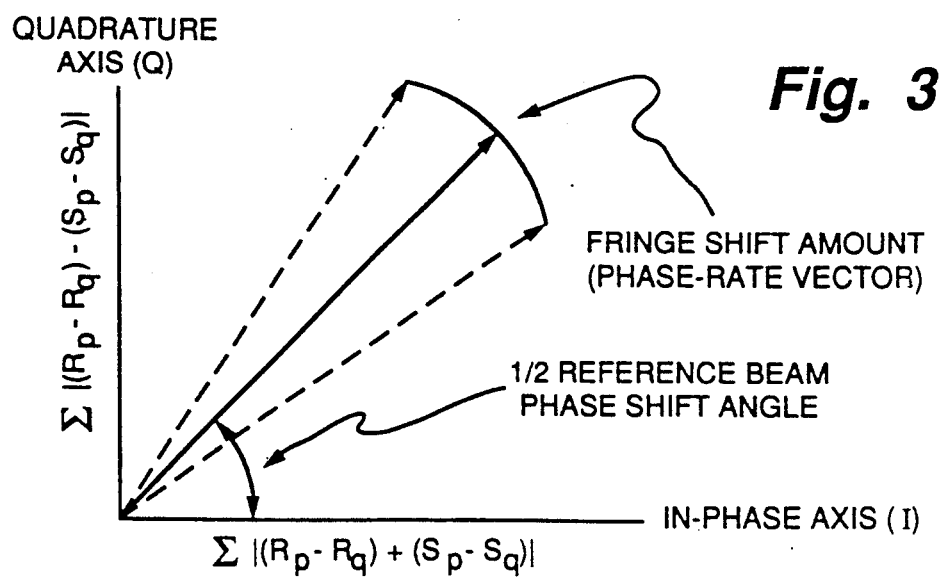

ASSEMBLE FIG. 6 AS ABOVE

ASSEMBLE FIG. 13 AS ABOVE

Fig. 7
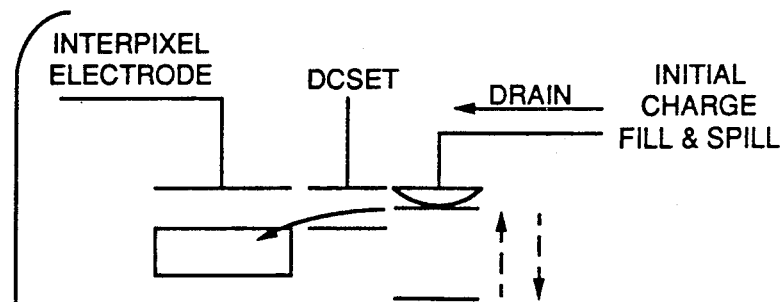
Fig. 7A
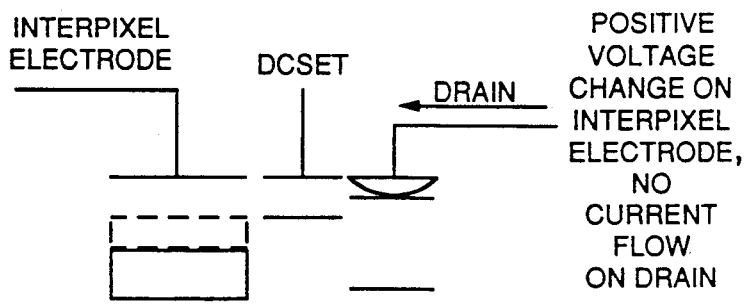
Fig. 7B
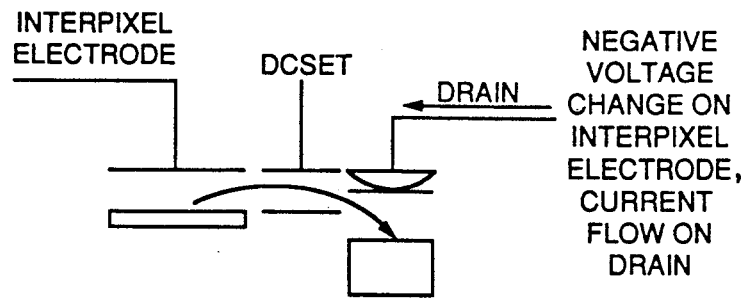
Fig. 7C

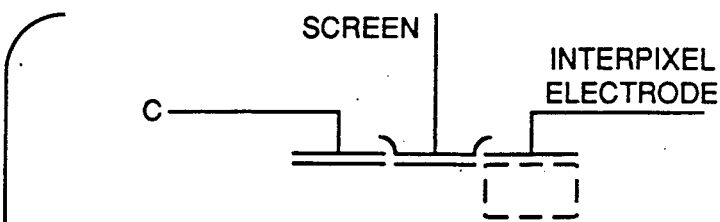
Fig. 8A
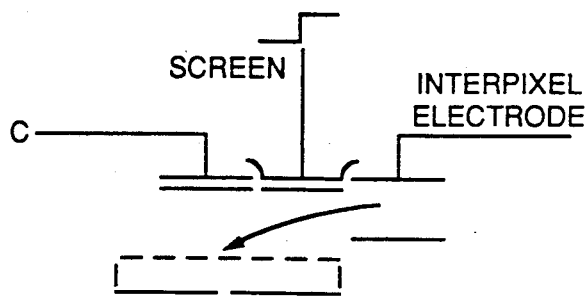
Fig. 8B
Fig. 8
CHARGE TRANSFER AWAY FROM INTERPIXEL ELECTRODE
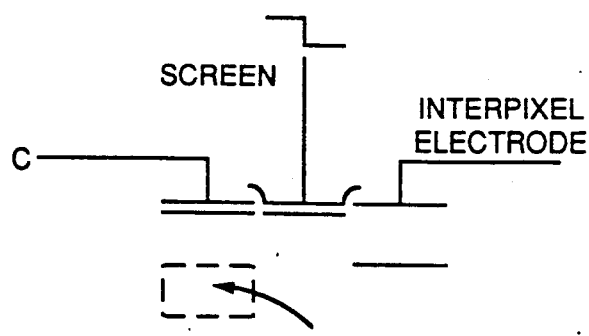
Fig. 8C

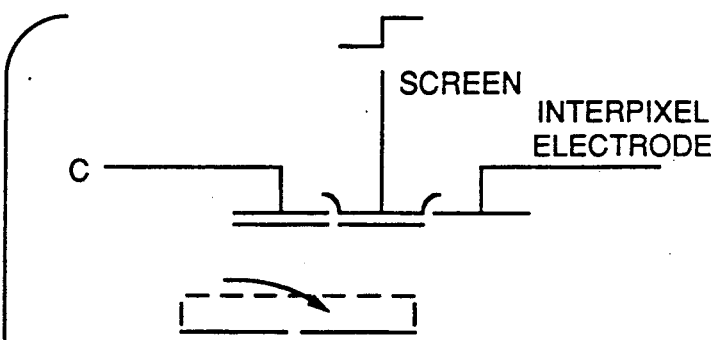
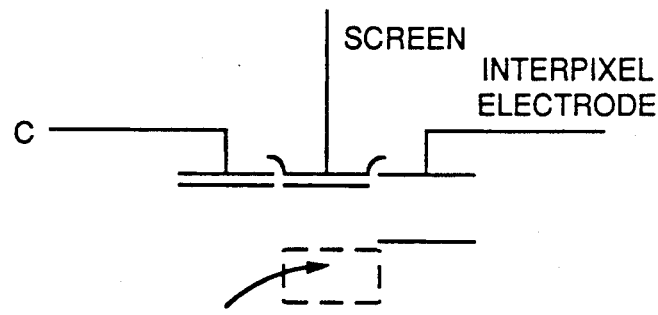
Fig. 9
CHARGE TRANSFER TOWARD INTERPIXEL ELECTRODE
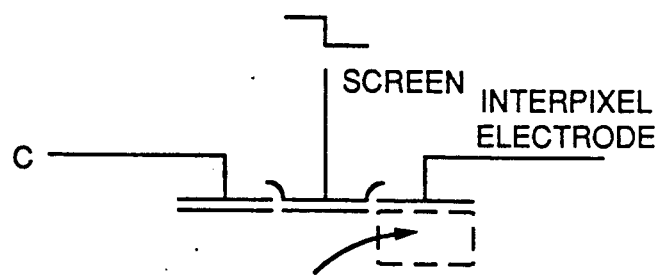

CHARGE-TRANSFER-DEVICE PLANAR ARRAY FOR DETECTING COHERENT-LIGHT PHASE

The invention relates to detecting the phase of coherent light by interferometric procedures using a planar array of charge transfer devices (CTDs) constructed on a substrate for converting optical holograms to electrical signals and, more particularly, to performing preliminary processing of the detection measurements in the charge domain in a new way in electronic circuitry constructed on the same substrate as the planar array of CTDs.

BACKGROUND OF THE INVENTION

The inventors have been involved in the development of a detector for measuring the phase modulation of a hologram image. The hologram images are sensed by a solid state imager, which converts the hologram images to electronic data. The interferometer being developed promises to improve the sensitivity of the phase modulation measurement of optical wavefronts by 10 to 20 dB over prior art techniques. To realize this improvement, new light sensing and signal processing approaches have had to be followed that allow hologram images to be processed at high resolution and speed, i.e., 1000×1000 pixels at a 100 kHz frame-rate.

In an optical interferometer using a solid state imager to sense holograms, successive frames of pixels are correlated on a pixel-by-pixel basis to determine phase changes in the light illuminating that particular pixel, and the individual correlation results are then summed. In the summation process phase change information is correlated and thus sums in a scalar addition process, while noise is substantially uncorrelated and thus sums in a vector addition process. Consequently, in the summation result signal-to-noise ratio is improved by a factor nominally equal to the square root of the number of pixels being summed. The summation may be part of an averaging wherein the summation is subsequently divided by the number of samples that were summed.

U.S. Pat. No. 4,780,605 issued Oct. 25, 1988 to J. J. Tiemann, entitled "COHERENT LIGHT PHASE DETECTING FOCAL PLANE CHARGE-TRANSFER-DEVICE", assigned to General Electric Company and incorporated herein by reference describes detecting the phase of coherent light by interferometric procedures using a solid-state imager that has a planar array of charge-transfer devices (CTDs) constructed on a substrate of semiconductive material. The planar array senses the interference or "fringe" pattern between a coherent optical carrier and an optical signal generated through phase-modulation of a coherent optical carrier of similar frequency, but not necessarily the same phase. This pattern is a hologram. Each CTD in the focal-plane array has a first charge storage region associated therewith for storing charge generated by a reference-phase coherent optical carrier and has a second charge storage region for storing charge generated by an oppositely phased coherent optical carrier of the same wavelength. The stored charges stored in the first and second charge storage regions are differentially sensed to remove direct-current pedestal from the in-phase signals commutated from the solid-state imager. Each CTD has a third charge storage region associated therewith for storing charge generated by a quadrature-leading-phase coherent optical carrier and has a fourth charge storage region for storing charge generated by a quadrature-lagging-phase coherent optical carrier of the same wavelength. The stored charges stored in the third and fourth charge storage regions are differentially sensed to remove direct-current pedestal from the quadrature signals commutated from the solid-state imager. Utilizing scanning generators located on the imager substrate, the picture elements (or "pixels") are successively scanned to provide both a time-division-multiplexed in-phase output signal and a time-division-multiplexed quadrature output signal from the imager. Reading out in-phase and quadrature signals from the same pixels concurrently eliminates the need for long-time individual sample storage. The in-phase and quadrature signals for each pixel are processed in accordance with trigonometric algorithms to obtain hologram pixel phase variations. The hologram pixel phase variations are summed in a correlation procedure to increase the signal-to-noise ratio of the optical phase detection results. In a variant of the U.S. Pat. No. 4,780,605 apparatus charges are stored for only one phase of reference coherent optical carrier and for only one phase of quadrature coherent optical carrier and direct components are suppressed by resampling procedures. A practical difficulty encountered with implementing the U.S. Pat. No. 4,780,605 interferometer or variants thereof is the need for accurately matching the amplitudes of the various-phase pulses of coherent light used for charging respective ones of the pair of charge storage regions associated with each CTD.

J. Chovan, W. E. Engeler, W. Penn and J. J. Tiemann in allowed U.S. patent application Ser. No. 338,881 filed Apr. 17, 1989, entitled "ELECTRONIC HOLOGRAPHIC APPARATUS", assigned to General Electric Company and incorporated herein by reference describe interferometers in which a single pulse of coherent light is used for generating both in-phase and quadrature signals for each pixel. To do this the spatial frequency of the pixels as defined by the spacing of the CTDs in parallel rows normal to the fringe pattern is arranged to be four times the spatial frequency of the fringe pattern. Utilizing scanning generators located on the imager substrate, the in-phase and quadrature-phase responses of successively scanned pixels are extracted on a time-division-multiplexed basis to be separated by comb filtering procedures taking place mostly outside the solid state imager.

To meet the requirements of the new optical interferometer small phase-shifts in a hologram image must be detected and processed at extremely high rates. Currently, solid-state imagers are viewed providing the best electronic cameras for real-time hologram image detection. However, system throughput would be limited by the relatively slow rate at which data can be read-out from existing solid-state imagers in which pixel locations are successively scanned.

A solid-state imager of the most usual type reads out individual picture-element (or "pixel") information on a time-division-multiplexed basis through a single output port. The maximum read-out rate on an output port is typically 20M pixels/sec, which limits the imager frame rate (the rate at which all the imager pixels can be read-out) to 20 Hz for a 1000×1000 pixel imager with a single output port.

The inventors knew at the time of their respective inventive contributions of a newer type of optical interferometer using a plane array of CTDs constructed on a substrate of semiconductive material, developed by J. Chovan, a coworker of theirs. With the Chovan type of optical interferometer, the spatial frequency of the pixels as defined by the spacing of the CTDs in parallel rows normal to the fringe pattern is arranged to be only two times the spatial frequency of the fringe pattern, and accommodations for variations in laser pulse amplitudes can be made. Considering the successive fields of pixels generated by the array of CTDs to be consecutively numbered modulo two, the odd-numbered fields of pixels are generated by the fringe pattern between the optical signal and an in-phase coherent optical carrier, and the even-numbered fields of pixels are generated by the fringe pattern between the optical signal and a quadrature coherent optical carrier. The computation of phase variations can be done on the basis of successive overlapping frames identified by respective ones of consecutive ordinal numbers, each odd-numbered frame consisting of an odd-field image succeeded by an even-field image, each even-numbered frame consisting of an even-field image succeeded by an odd-field image, and each frame overlapping its preceding and succeeding frames each by one field. The direct-current pedestal is removed from each field of pixels by performing a subtraction between each pair of pixels that abut each other in the direction normal to the fringe pattern, resampling the fields without DC terms and with the same degrees of attendant phase shift. The resultant in-phase and quadrature-phase field images without direct-current pedestals are correlated in an initial correlation procedure, by multiplying together correspondingly located pixels in each pair of successive fields in a frame, to generate a new succession of image frames, each consisting of but a single field. In this new succession of image frames, pixel values vary in response both to the phase-modulation of the optical signal and the amplitude of the coherent optical signal and the coherent optical carriers used to form the hologram in the focal plane. The variation of pixel values with the product-of-amplitudes term is removed in an amplitude-normalization procedure, using information concerning the amplitudes of the direct-current pedestals removed from the original in-phase and quadrature-phase field images. Amplitude normalization is done either before or after a final correlation procedure in which the pixel values of each of the image frames in the new succession are summed together, which final correlation procedure is done to increase the signal-to-noise ratio of the optical phase detection results.

Before Chovan's newer type of optical interferometer was invented, frame-rates above 10 kHz had only been achieved in optical interferometers using solid-state imagers by:

(a) limiting the pixel resolution, (e.g., using 128×1 pixel line arrays) and/or (b) providing multiple parallel read-out ports from the imager. For the optical interferometers the inventors and their co-workers including Chovan have been called upon to develop, even multi-port imagers are unfeasible. To read out a 1000×1000 pixel imager at a 100 kHz frame-rate, 5000 ports running at $2\times10^4$ pixels/sec would be required. Wiring these ports from the imager and providing the digital hardware to support 5000 high-speed processing channels is too costly in terms of size, power, and packaging complexity.

Chovan in developing his new type of optical interferometer had discerned that if pixel-by-pixel correlation procedures can be done parallelly within the solid state imager, rather than sequentially outside the imager, and if the subsequent summation procedure can then be done within the imager as well, then the number of samples of output signal from the imager can be reduced by a factor equal to the number of photosensors in the imager. That is, by a factor of a million for a 1000×1000-pixel imager. Furthermore, the parallel processing of photosensor data avoids the need for pixel-scanning generators, which generators and connections from them to individual photosensors take up considerable area on the substrates of prior-art solid state imagers.

Some practical difficulties have been encountered in developing Chovan's new type of optical interferometer. It has been difficult to find a good design for analog multipliers that permits them to be constructed on the imager substrate and integrated with respective photosensors. The amplitude normalization procedure to remove dependency of phase response to the amplitudes of the illuminating and reference beams is cumbersome.

The invention concerns an optical interferometer that does parallel processing of pixel data within the solid state imager. Processing of the in-phase and quadrature-phase images with direct-current pedestals removed is done differently than in the Chovan imager, so as to avoid actually having to multiply correspondingly located pixels in each pair of successive fields together. This better facilitates the pixel processing being done in the charge domain in circuitry constructed on the same substrate as the planar array of CTDs.

SUMMARY OF THE INVENTION

Respective processors for pairs of photodetecting elements are included in an imager, embodying an aspect of the invention, which is particularly suited for sensing hologram fringe patterns in an optical interferometer. These processors remove the direct-current pedestal from in-phase and quadrature-phase field images, then perform partial correlations of the resulting field images on a pixel-by-pixel basis, and then sum the partial correlations to complete the image correlation process and to provide imager output signal or the basis therefor. This localized processing greatly reduces the number of samples that have to be brought out of the imager each frame when the imager is used in an optical interferometer to detect phase modulation in an optical signal, allowing for increased frame rates in accordance with a further aspect of the invention. Image correlation is done according to a novel algorithm that avoids actually having to multiply together correspondingly located pixels in each pair of successive fields forming a successive non-overlapping frame. The multiplier-free processors are compact enough to be located within the solid state imager close to the pairs of photosensors they respectively serve in the imager.

BRIEF DESCRIPTION OF THE DRAWING

FIG. 2 is a diagram relating picture element ("pixel") indexing to the hologram fringe patterns during odd and even fields.

FIG. 3 is a diagram illustrating how phase-rate vectors are determined in optical interferometers constructed in accordance with the invention.

FIG. 7 comprises FIGS. 7A, 7B and 7C which diagram the flows of charge into and out of a magnitude capacitor to the top plate of which connects the interpixel bus in the FIG. 2 interpixel processor.

FIG. 8 comprises FIGS. 8A, 8B and 8C which are charge flow diagrams of how, during processing in the FIG. 4 interpixel processor, charge is transferred away from charge storage locations to which the interpixel bus connects, transferring therefrom to other charge storage locations.

FIG. 9 comprises FIGS. 9A, 9B and 9C which are charge flow diagrams of how, during processing in the FIG. 4 interpixel processor, charge is transferred to charge storage locations to which the interpixel bus connects, transferring thereto from other charge storage locations.

DETAILED DESCRIPTION

Figure 1:
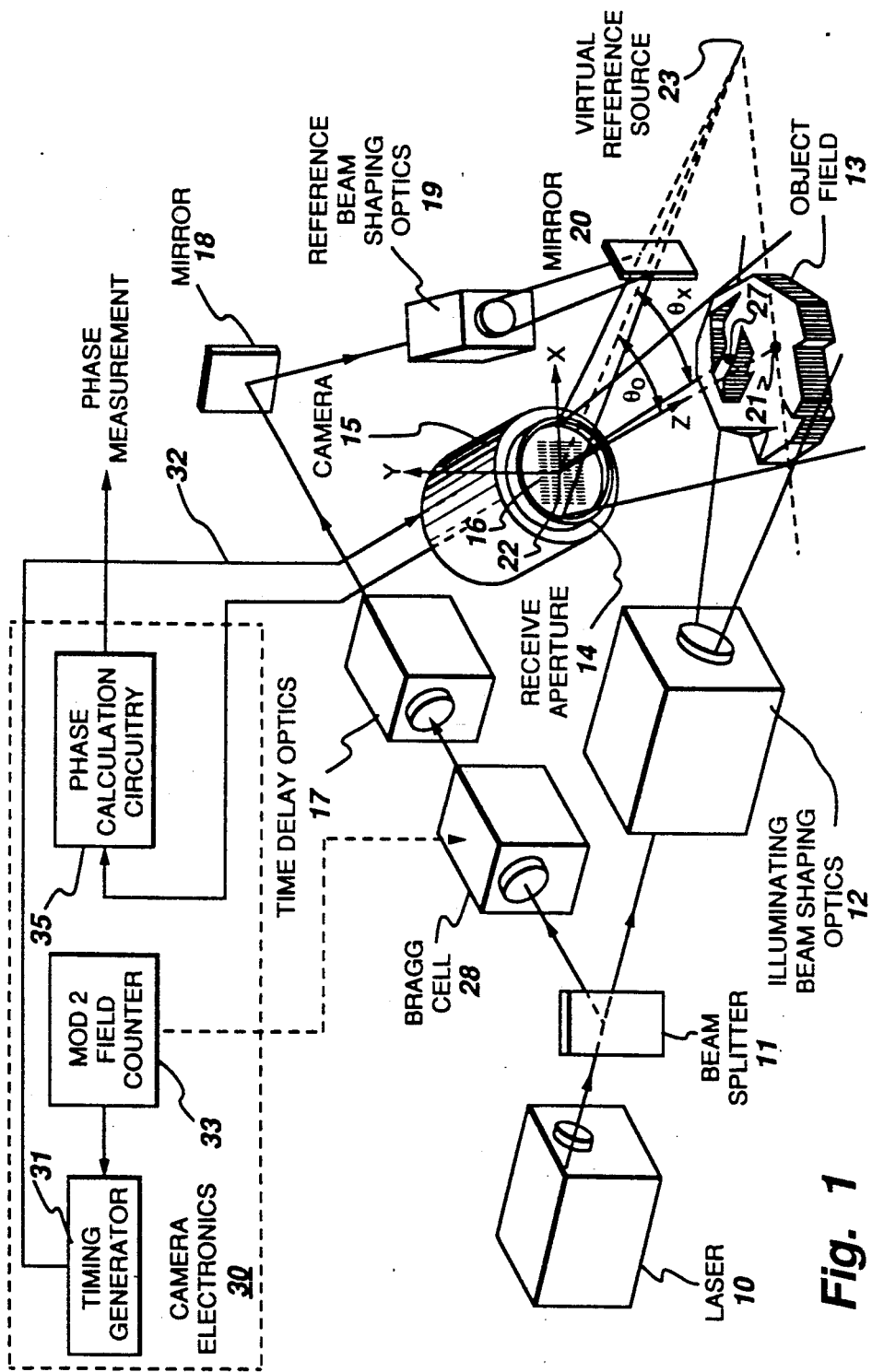
FIG. 1 is a perspective view of an apparatus for measuring phase changes in the hologram of an object field.

FIG. 1 is a perspective view of an apparatus for measuring phase changes in the hologram of an object field. This apparatus, which can be considered to be a type of optical interferometer, uses optical processing similar to that shown in U.S. patent application Ser. No. 338,881 filed Apr. 17, 1989 and entitled "ELECTRONIC HOLOGRAPHIC APPARATUS", except for being modified to include a Bragg cell 28 placed for modulating the phase of a coherent light wavefront used as a reference beam in the optical mixing process. The Bragg cell 28 is a device responding to an electrical control signal to selectively retard the wavefront of the light passing therethrough by an extra quarter wavelength for alternate image fields.

(An alternative modification would be to place the Bragg cell 28 for modulating the phase of a coherent light wavefront used as an illuminating beam in the optical mixing process, instead of for modulating the phase of a coherent light wavefront used as a reference beam in the optical mixing process. FIG. 1 shows a suitable location for the Bragg cell in this alternative modification of the U.S. patent application Ser. No. 338,881 apparatus.)

The FIG. 1 apparatus comprises means for producing mutually coherent optical illuminating and reference beams, and a Charge Transfer Device (CTD) camera 15 having an aperture directed toward the object field to receive reflections of the illuminating beam therefrom, arranged to receive the reference beam as well, and suitably aligned with respect to the beams and object field to record holographic data. The camera 15, which operates without a conventional focusing lens, samples the illumination impinging on photosensors disposed on the sensor plane, the illumination passing through an optical aperture of sufficient size to resolve individual elements of the object field to be used in sensing displacements of the object field. The illumination impinging on the sensor plane is a hologram that may be characterized as a Fresnel/Fourier transform of the light reflected from the illuminated object. This transform is often referred to as an "optical fringe pattern", or simply "fringe pattern", since it is a grating pattern of alternating brightness and darkness.

The CTD camera 15, like the U.S. patent application Ser. No. 338,881 camera includes a solid state imager of a type having a bulk substrate of a semiconductor material of a first conductivity type; an epitaxial layer of a second conductivity type disposed on a first surface of the bulk substrate, said second conductivity type being opposite to said first conductivity type; a layer of electrically insulating material having a first surface disposed against the epitaxial layer and having a second surface; electrodes of electrically conductive material disposed within the layer of electrically insulating material, the electrodes being essentially planar and parallel to the first surface of the bulk substrate; means for making electrical connections to the electrodes via paths of electrically conductive material disposed within the layer of electrically insulating material; a layer of optically opaque mask material disposed against the first surface of the layer of electrically insulating material and provided with windows therethrough arranged at regular intervals in parallel rows evenly spaced apart, the layer of electrically insulating material being thin enough in the vicinity of the windows for light to pass therethrough; and a plurality of photosensors disposed in a sensor plane along the first surface of the bulk substrate, in spatial registration with the windows in the opaque mask, for generating respective electrical responses to impinging light. The epitaxial layer is connected to electrical ground, and the bulk substrate is biased to reverse bias the semiconductor junction between it and the epitaxial layer disposed on its first surface. The camera 15 differs from the U.S. patent application Ser. No. 338,881 camera in that the windows in the opaque mask adjacent to each other in a row have a pixel index, or spacing between their centers, that corresponds to one-half, rather one-quarter, the wavelength of the hologram fringe pattern.

The camera 15 also differs from the U.S. patent application Ser. No. 338,881 camera in that the charge packets accumulated by the photosensors are not remotely sensed serially by column and by row, but rather are locally sensed, in parallel. Accordingly, the solid state imager used in camera 15 does not include scanners for serially sensing the charge packets accumulated by the photosensors. The sensing results are locally processed within the solid state imager to generate processor results that are parallelly summed to generate imager output signal. The camera electronics 30 used with the camera 15 and described in detail further on also differs from the camera electronics of prior-art holographic cameras.

As shown in FIG. 1, the illuminating and reference beams originate from a single laser 10, the beam from the laser impinging on a beam splitter 11 which diverts a portion of the laser energy into a separate path for the reference beam. The portion of the laser beam which is not diverted is supplied to the illuminating beam optics 12 where the laser beam is expanded to illuminate the object field 13. Thus, coherent light reflected from the object field enters the aperture 14 of the CTD camera 15, and creates a speckle pattern over the sensor plane 16 of the camera. The portion of the laser energy which is diverted at the beam splitter 11, traverses a Bragg cell 28, the time delay optics 17, a mirror 18, reference beam shaping optics 19 and a mirror 20. The mirror 20 projects the reference beam back via the aperture 14 to the sensor plane 16 of the camera. The function of the illuminating beam shaping optics is to illuminate that portion of the object field viewed by the camera. The function of the reference beam shaping optics 19 is to illuminate the sensor plane which provides a means for obtaining the phase information for the hologram. The Bragg cell 28 responds to an electrical control signal that alternates in value from field to field to change by a quarter wavelength the phase relationship of the illuminating and reference beams from field to field, resulting in a 90 degree shift in the spatial frequency of the fringe pattern generated on the sensor plane of the solid state imager in the camera 15. Successive fields are considered to be consecutively ordinally numbered modulo two, the first fields being termed odd fields and the zeroeth fields being termed even fields. An odd field and its following even field will be considered to constitute a respective odd-numbered frame in a succession of overlapping frames identified by respective ones of consecutive ordinal numbers assigned in order of the occurence of the frames. An even field and its following odd field will be considered to constitute a respective even-numbered frame in that succession of overlapping frames. As will be explained, the optics 19 is designed to place the virtual source of the reference beam at the same distance (Z coordinate) from the sensor plane as the center of the object field.

In the FIG. 1 illustration, the optical paths of both the illuminating and reference beams originate at the laser 10 and both terminate on the sensor plane of the camera. If the path lengths of the two beams are sufficiently equalized, both beams will reach the sensor plane at the same time on the average during odd fields and with a quarter wavelength displacement on average during even fields. Any laser instability will exhibit itself in equal degrees in both the illuminating and reference beams, thus preserving fractional optical wavelength accuracy in the holographic information read out at the sensor plane. The time delay optics 17 provides the means to equalize the path lengths of the two beams during odd fields. Differences in the path lengths of the two beams from the laser 10 to the sensor plane 16 will always exist if the object field is of extended depth (in the Z axis direction). Greater differences between the two path lengths may be tolerated, however, as the coherence length of the laser is increased. Therefore, the more stable the laser, the greater the tolerable differences in path lengths, and the greater the depth of field, before instability in the measurements becomes significant.

The reference beam provides the means for obtaining the phase information for the hologram. As the reference beam impinges on the speckle pattern already present on the sensor plane of the camera, due to the illuminating beam, a spatially periodic interference pattern, which may be termed a "grated speckle pattern" is created. The interference pattern with its successive light and dark regions allows appropriately placed sensors which sense only the intensity of the light to determine both in-phase components of its amplitude and quadrature components of its amplitude, from which the phase of the illuminating beam relative to the reference beam may be calculated. The phase is, of course, measured with respect to the phase of the reference beam.

The recording of holographic information gains greatly in accuracy of amplitude and phase measurement and in overall sensitivity if the spatial relationships illustrated in FIG. 1 are maintained. The illumination, the source of the reference beam, and the location of the object field establish a three-axis coordinate system, with which the angular aperture and sensor plane of the camera 15 must be brought into alignment for optimum phase and amplitude fidelity and for maximum sensitivity. Proper positioning of the reference source, object field and camera establishes the position, orientation and spatial frequency of the fringes, and in the preferred disposition, makes the spatial frequency of the fringes substantially constant over the camera aperture. Proper orientation of the sensor plane of the camera in relation to the fringes, and proper magnification of fringes in relation to the interval between sensors on the sensor plane further facilitates accuracy in detecting the holographic information. These matters will now be discussed in detail.

Referring again to FIG. 1, the camera is ideally positioned to place the center 21 of the object in a line perpendicular to the sensor plane erected from the center 22 of its aperture. Thus the origin of a three-axis coordinate system is the center of the sensor plane, the Z axis being the line perpendicular to the sensor plane passing through the center 21 of the object. The X and Y axes lie in the sensor plane, but their orientation remains undetermined until the position of the reference beam is fixed.

The reference beam shaping optics 19 are adjusted to place the position of the virtual source of the reference beam at the point 23. The virtual source 23 of the reference beam is small in relation to the object field, and may be treated as a point source. The interference fringes produced by the reference illumination and the illuminated object field are perpendicular on the average to the plane defined by the points 21, 22 and 23. On the other hand only light originating along the line of intersection of the plane 21, 22, 23 with the object field will produce fringes exactly perpendicular to that plane. Exactness is not required to achieve accurate results over a reasonable field of view. Thus, to sample the spatial frequency of the fringes generated from all points of the object field, the photosensors should be arranged in rows parallel to the plane (21, 22, 23). The intersection of this plane (21, 22, 23) with the sensor plane thus defines the X axis, and by inference the position of the Y axis, which is defined to be perpendicular to both the X axis and the Z axis. The columns of sensors are parallel to the Y axis. The rows of sensors, which are used for determining the spatial phase of the fringes are thus parallel to the X axis.

Further, the virtual reference source is preferably disposed at the same Z coordinate distance from the origin as the center of the object field. This has the advantage of reducing parallax from different view points within the receive aperture as to the same object point and tends to make the fringe spacing more uniform. With uniformity in the fringe spacing, constancy of the spatial sampling rate becomes more efficient. As noted previously, the pixel index in the solid state imager used in camera 15 is to be one-half the wavelength of the fringe pattern.

Continuing, the spatial angular spectrum depends upon the angle between the point of origin 23 of the reference beam and the resolution points in the object field. The number of fringes per speckle is controlled by the angle, and the average size of speckles is selected so there is at least a full wave of brightness variation in the spectrum, in order to permit detection of the spatial phase of the speckle. When the object field is in the far field of the receive aperture, the angle between a given point in the object field and the normal to the plane of the receive aperture (i.e., the Z axis) has the same value $\theta$ for all viewpoints within the receive aperture. Under these conditions, a collimated reference beam appearing to come from the far field is desirable. However, when the object field is in the near field of the receive aperture, a fixed point 27 in the object field appears at different angles as seen from different points within the aperture. Under these conditions, the superposition of a collimated reference beam at a fixed angle results in an interference pattern whose fringe spacing varies considerably with position in the aperture. A large variation in the fringe spacing results in inefficient sampling of the pattern. The condition can be mitigated by placing the point 23 of the reference beam at nominally the same Z coordinate distance as the center of the object field. Under these conditions there is no parallax between points in the object field and the reference point. This results in the angle between the reference point and any fixed point in the object field being nominally the same value $\theta$ for all viewpoints within the receive aperture and leads to uniformity in the fringes spacing and efficiency in sampling those fringes at a constant spatial sampling rate. When the angle between the reference point and any fixed point in the object field is nominally the same value $\theta$ for all viewpoints within the receive aperture, then $\theta$ can be arranged so that the fringe pattern wavelength is twice the pixel index, as required in the FIG. 1 apparatus.

Camera electronics 30 includes a timing generator 31 that transmits a number of control signals via a multiple-wire cable 32 to the camera 15 to be broadcast to each of the processors associated with a respective photosensor in the solid state imager, as will be described in detail further on. The timing generator 31 also generates pulses indicative of the beginning of each imager field.

The pulses indicative of the beginning of each imager field supplied by the timing generator 31 are counted modulo two by a field counter 33 to determine whether each successive field is odd or even. Field counter 33 may simply comprise a triggered or "T" flip-flop, for example, and feeds back the field count to timing generator 31. Odd fields are determined by a one count from field counter 33; and even fields, by a zero count. The zero count from field counter 33 conditions Bragg cell 28 to retard the phase of the reference beam an additional 90 degrees.

Figure 5:
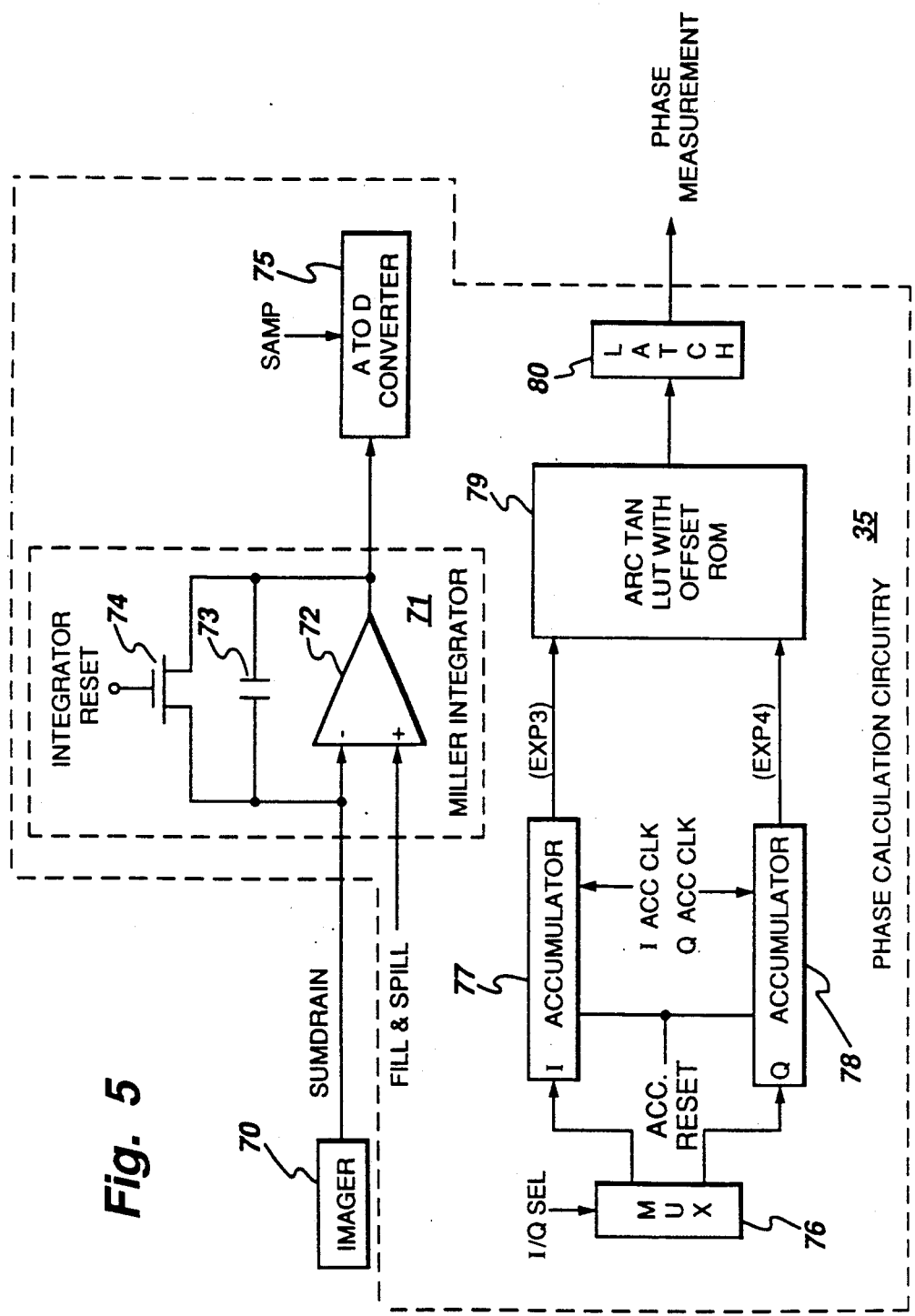
FIG. 5 is a schematic diagram showing off-imager-substrate phase calculation circuitry for use with a solid state imager using interpixel processors as shown in FIG. 4.

Camera electronics 30 also includes phase calculation circuitry 35 that responds to analog output currents to generate digital output signals descriptive of the phase differences in the illuminating and reference beams of light impinging on the sensor plane of the solid state imager in the camera 15. The nature of the phase calculation circuitry 35 will be more specifically described further on, when FIG. 5 is considered.

Certain optical processing systems require the high speed tracking of a hologram fringe pattern which moves in the X direction in the sensor plane of the solid-state camera 15. Since it is the target motion which creates the fringe pattern motion, the fringe tracking signal obtained from the system corresponds to the motion of the target. It is desired to detect and track motion of this fringe pattern even when the return light from the target is weak. Under this condition, the fringe pattern modulation amplitude is small and rides of top of a large direct current pedestal. The motion of this fringe pattern may also be corrupted by noise sources which become uncorrelated when observed a speckle distance apart in the focal plane. To increase the system signal-to-noise ratio, measurements of fringe motion are made over a large area are averaged, so an imager having a large number of pixels is required. The target may also be moving at high rates, so imager fields rates in excess of 100 Khz may be required.

To track the fringe pattern motion using correlation processing, an image is generated with the reference beam phase at 0 degrees. To remove the DC pedestal from the fringe pattern, pixel subtraction is performed between adjacent pixels along the direction of the fringe pattern. This information is stored, and a second image is generated with the reference beam phase changed by a quarter wavelength, to 90 degrees. The pixel subtraction is again performed, the two resultant images are now multiplied pixel by pixel, and the results summed. If no object motion occurred during the imager exposures, the fringe patterns will be exactly 90 degrees apart, and the resultant sum will be approximately zero. However, any fringe motion which occurred between fields will product a net sum which corresponds to the fringe motion.

FIG. 2 may help the reader to visualize the odd-field hologram fringe pattern R and even-field hologram fringe pattern S as measured in a direction parallel to the X axis of the sensor plane of the camera 15 in FIG. 1, which fringe patterns obtain when no object motion occurred between fields R and S. Distances in the direction parallel to the X axis may be expressed in terms of a pixel index value p that is chosen to be at 180-degree intervals in the hologram fringe patterns. Note the 90 degree spatial phase retardation of the even-field hologram fringe pattern S compared to the odd-field hologram fringe pattern R, which arises from the reference beam being retarded an additional quarter wavelength during even fields.

The fringe patterns in two fields R and S which together comprise a frame can be represented simply as a sine wave signal oriented along an imager now if the DC pedestal is removed, as may be done by subtractively combining successive pixels in a resampling procedure.

$$\text{Image } R = \sin(\omega X) \tag{Eq. 1}$$

$$\text{Image } S = \sin(\omega X + \phi + 90) = \cos(\omega X + \phi) \tag{Eq. 2}$$

$$\int R \times S = \int \sin(\omega x)\cos(\omega x + \phi) \tag{Eq. 3}$$
$$= \int \sin(2\omega x + \phi) + \sin(\phi)$$

where:
$\omega$ = fringe frequence
$\phi$ = degree of fringe motion between frames
X = position along the imager row The first term in Eq. 3 will sum to a small high frequency error which can be filtered out. The second term becomes the fringe tracking signal, which is a measure of the phase shift in the reflected illuminating beam as measured against the reference beam.

The algorithm described above requires pixel subtraction, image storage, image multiplication, and data summation. Implementation of these functions in the charge domain has been demonstrated using CID imagers except the four quadrant multiply. This function is inherently difficult to implement in the charge domain because the charge collected in an imager is one polarity, either electrons or holes.

To implement the correlation processing scheme in the charge domain on the same substrate as the imager, the correlation processing algorithm is rewritten as shown in the following equation.

$$\int R \times S = \tfrac{1}{4}\int (R+S)^2 - \tfrac{1}{4}\int (R-S)^2 \tag{Eq. 4}$$

By evaluating the right side of (Eq. 4), the equivalent frame multiplication can be implemented with additions, subtractions and a square law function. Since we know of no precise square law function in the charge domain, the magnitude function (absolute value) is used as an approximation. To remove the DC pedestal adjacent pixels along an imager row can be differentially combined as an initial part of the processing, much as in the prior-art electronic holographic cameras.

The expression to the right of the equal sign in (Eq. 4) is a distributive function insofar as individual pixels are concerned. If a charge domain processor is provided for each pixel in an imager, the ith pixel on a row calculates the following two expressions.

$$|(R_p - R_q) + (S_p - S_q)| \tag{Exp. 1}$$

$$|(R_p - R_q) - (S_p - S_q)| \tag{Exp. 2}$$

where:
R = imager signal from a row, 0 degrees laser phase;
S = imager signal from a row, 90 degrees laser phase;
p = pixel index along a row; and
q = p + 1.

The results of an expression calculation from each processor in the imager are summed on a common node which provides the only output from the imager. The summation of the Exp. 1 terms for the pairs of adjacent pixels minus the summation of the Exp 2 terms for those pairs of adjacent pixels completes the distributed calculation of Eq. 4 as shown below.

$$\int R \times S = \sum_{\text{pairs}} |(R_p - R_q) + (S_p - S_q)| - \tag{Eq. 5}$$

$$\sum_{\text{pairs}} |(R_p - R_q) - (S_p - S_q)|$$

The subtraction of the summation terms could be performed digitally off-chip at relatively slow data rates.

The measure of phase change obtained by the foregoing procedure needs to be normalized for the variations of the illuminating beam (and of the reference beam where such variations can exist). This normalization can be made based from DC pedestal measurements, for example, but is unwieldy to implement. Where only the variation in phase of the hologram is sought, a more powerful interpretation of the terms $$\sum_{\text{pairs}} |(R_p - R_q) + (S_p - S_q)| \tag{Exp. 3}$$

and $$\sum_{\text{pairs}} |(R_p - R_q) - (S_p - S_q)| \tag{Exp. 4}$$

to be computed (in large part) on the imager, the inventors find, is to consider them to be the in-phase and quadrature components (real and imaginary) of the phase-rate vector of the hologram. Consider why this may be done.

Referring to Eq. 5 suppose the fringe patterns are sinusoidal with the fields R and S respectively defined as in Eq. 6 and in Eq. 7 following:

$$\text{Image } R = M \sin(\omega X) \tag{Eq. 6}$$

$$\text{Image } S = M \sin(\omega X + \phi + \Delta) \tag{Eq. 7}$$

where
M is the light intensity of the fringes and
$\Delta$ is the reference beam shift between frames.
Substituting Eq. 6 and Eq. 7 into Eq. 5, the following equation results.

$$\int R \times S = \sum_{\text{pairs}} |M\sin(\omega x) + M\sin(\omega x + \phi + \Delta)| - \tag{Eq. 8}$$

$$\sum_{\text{pairs}} |M\sin(\omega x) - M\sin(\omega x + \phi + \Delta)|$$

Expanding Eq. 8 using the trigonometric identities $$\sin A + \sin B = 2\cos[(A-B)/2]\sin[(A+B)/2]$$

and $$\sin A - \sin B = 2\sin[(A-B)/2]\cos[(A+B)/2],$$

and factoring out M, the following equation is obtained $$\int R \times S = \sum_{pairs} |2M \cos[(\phi/2) + (\Delta/2)] \sin[2\omega x + \quad \text{(Eq. 9)}$$

$$(\phi/2) + (\Delta/2)]| - \sum_{pairs} |2M \sin[-(\phi/2) - (\Delta/2)] \cos[2\omega x +$$

$$(\phi/2) + (\Delta/2)]|$$

If $|\phi| < \Delta/2$, then $\cos[(\phi/2)+(\Delta/2)]$ is always positive and $\sin[-(\phi/2)-\Delta/2)]$ is always negative. The cos $[(\phi/2)+(\Delta/2)]$ and $\sin[-(\phi/2)-(\Delta/2)]$ terms accordingly can be factored out of the bracketed terms and the summations to generate the following equation $$\int R \times S = \cos[(\phi/2) + (\Delta/2)] \sum_{pairs} |2M \sin[2\omega x + \quad \text{(Eq. 10)}$$

$$(\phi/2) + (\Delta/2)]| - \sin[(\phi/2) + (\Delta/2)] \sum_{pairs} |2M \cos[2\omega x +$$

$$(\phi/2) + (\Delta/2)]|$$

Note that the summation expressions are just the sum of a rectified sine wave and the sum of a rectified cosine wave, respectively. If the number of fringe cycles over the imager is larger the results of the summation will be approximately the same, a constant $\Gamma$ called the "carrier" estimate. This is because any error owing to the imager not summing over an integral number of cycles of fringe pattern will be negligibly small compared to the entire summation result. Eq. 10 can be rewritten substituting $\Gamma$ for each of the summation results to obtain the following equation.

$$\int R \times S = \Gamma\{\cos[(\phi/2)+(\Delta/2)] - \sin[(\phi/2)+(\Delta/2)]\} \quad \text{(Eq. 11)}$$

Note that Exp. 3 has been shown to yield a cos $[(\phi/2)+(\Delta/2)]$ term scaled by a factor $\Gamma$ and Exp. 4 has been shown to yield a sin $[(\phi/2)+(\Delta/2)]$ term scaled by the same factor $\Gamma$. One can view the Exp. 3 and Exp. 4, then, as the in-phase and quadrature components of the phase rate of the hologram.

FIG. 3 diagrams this relationship. If the reference beam is shifted 90 degrees between fields as disclosed above, the difference between the angle of this vector and one-half the reference beam phase shift (45 degrees) is the phase-shift of the hologram fringe pattern between imager exposures. To compute the phase-shift, the better expression is therefore the one following.

$$\tan^{-1}\left(\frac{\sum_{pairs} |(R_p - R_q) + (S_p - S_q)|}{\sum_{pairs} |(R_p - R_q) - (S_p - S_q)|}\right) - 45° \quad \text{(Exp. 5)}$$

The expression above is the preferred one to calculate, since it compensates for changes in the magnitude of the phase-rate vector simply. As will be described in detail further on, the computation of the above expression is done in the phase calculation circuitry 34 of camera electronics 30, rather than in the solid state imager within camera 15.

Figure 4:
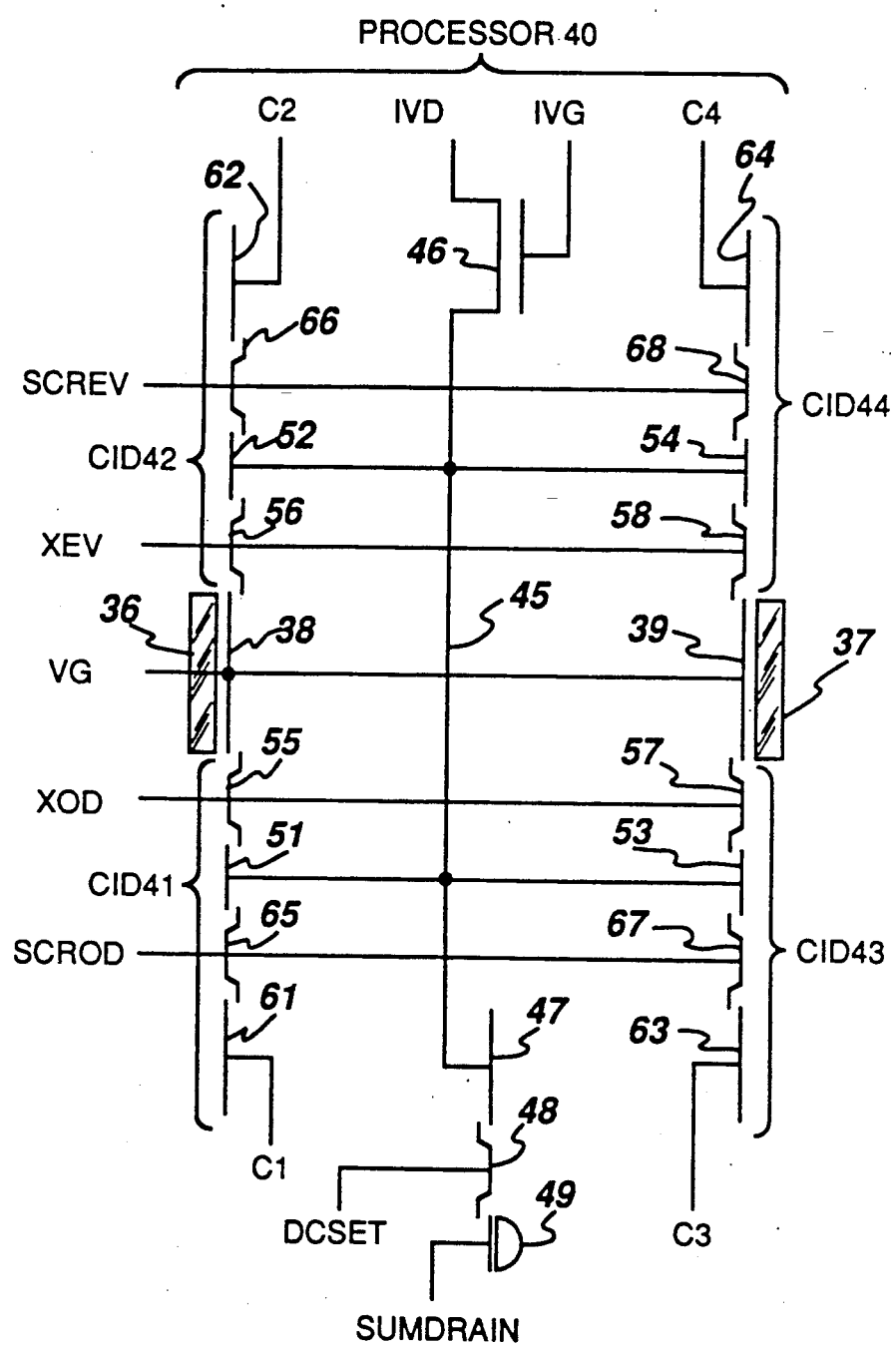
FIG. 4 is a schematic diagram of one of the respective on-substrate interpixel processors as serves each successive non-overlapping pair of photosensors in the row of a solid state imager that is an embodiment of the invention in one of its aspects.

FIG. 4 shows a respective multiplier-free processor 40 associated with a pair of photosensors 36 and 37 sequentially located in one row of the multiple-row solid state imager of the electronic camera 15 of FIG. 1. Processor 40 includes first through fourth charge injection devices (CIDs) 41–44; an interpixel bus 45; a reset transistor 46 for periodically DC-restoring the interpixel bus 45; a magnitude capacitor having one of its plates in the reverse-biased bulk substrate, and having electrode 47 as another plate; a barrier electrode 48 for contolling the flow of charge from the magnitude capacitor; and a portion 49 of a summation drain to which there is the controlled flow of charge from the magnitude capacitor with electrode 47 as top plate. Respective busses for VG, C1, C2, C3, C4, IVD, IVG, SCROD, SCREV, XOD, XEV and DCSET voltages connect from the timing generator 31 in camera electronics 30 to respective substrate interface connections to be distributed by on-substrate busing to each multiplier-free processor, including processor 40, on the solid state imager substrate. The summation drain disposed in the epitaxial layer on the imager substrate collects charge drained from the respective magnitude capacitors of each multiplier-free processor, including processor 40, on the imager substrate. The summed charge provides the imager output signal or, alternatively, the basis for the imager output signal. The imager output signal may be an analog voltage measuring the integral of the summed charge drawn from the sum drain as generated by a Miller integrator in one such alternative, for example, or may be a digital output signal measuring the integral of the summed charge drawn from the sum drain as generated by an analog-to-digital converter.

Photosensors 36, 37 etc. are in locations (as indicated by the areas enclosed by dashed line) on a planar surface of the substrate of semiconductive material which are beneath windows transparent to light in an opaque mask layer overlying the rest of that substrate, including the portions of that substrate into which the processors 40 etc. are integrated. The photosensors 36, 37 etc. may simply be MOS capacitors, or may be photodiodes, or may be composite structures each combining at one situs an MOS capacitor with a photodiode. Photosensors 36 and 37 can be considered as being MOS capacitors that have the substrate as respective first plates and that have as respective second plates electrodes 38 and 39 each connected to a bus that supplies a bias voltage VG.

The first CID 41 in processor 40 has a charge-sensing electrode 51 connecting to the electrode 47 of the magnitude capacitor via interpixel bus 45, a transfer gate electrode 55 that maintains a barrier potential to prevent charge transfer between wells under electrodes 38 and 51 except at the beginning of odd fields, a control electrode 61 for controlling the direction of charge flow to or from under the charge-sensing electrode 51 during odd-field computation, and a screen electrode 65 for preventing the transients of the C1 clock signal applied to the control electrode 61 coupling to the electrode 51 and thence to the interpixel bus 45. The second CID 42 in processor 40 has a charge-sensing electrode 52 connecting to the electrode 47 of the magnitude capacitor via interpixel bus 45, a transfer gate electrode 56 that maintains a barrier potential to prevent charge transfer between wells under electrodes 38 and 52 except at the beginning of even fields, a control electrode 62 for controlling the direction of charge flow to or from under the charge-sensing electrode 52 during even-field computation, and a screen electrode 66 for preventing the transients of the C2 clock signal applied to the control electrode 62 coupling to the electrode 52 and thence to the interpixel bus 45. The third CID 43 in processor 40 has a charge-sensing electrode 53 connecting to the electrode 47 of the magnitude capacitor via interpixel bus 45, a transfer gate electrode 57 that maintains a barrier potential to prevent charge transfer between wells under electrodes 39 and 53 except at the beginning of odd fields, a control electrode 63 for controlling the direction of charge flow to or from under the charge-sensing electrode 53 during odd-field computation, and a screen electrode 67 for preventing the transients of the C3 clock signal applied to the control electrode 63 coupling to the electrode 53 and thence to the interpixel bus 45. The fourth CID 44 in processor 40 has a charge-sensing electrode 54 connecting to the electrode 47 of the magnitude capacitor via interpixel bus 45, a transfer gate electrode 58 that maintains a barrier potential to prevent charge transfer between wells under electrodes 39 and 52 except at the beginning of even fields, a control electrode 64 for controlling the direction of charge flow to or from under the charge-sensing electrode 54 during even-field computation, and a screen electrode 68 for preventing the transients of the C4 clock signal applied to the control electrode 64 coupling to the electrode 54 and thence to the interpixel bus 45.

FIG. 5 shows a solid state imager 70 of a type employing multiplier-free processors (e.g., like 40) to generate the half-wave-rectified SUMDRAIN output currents supplied to the phase calculation circuitry 35 assumed to be located externally to imager 70. A Miller integrator 71 in circuitry 35 receives half-wave-rectified SUMDRAIN output currents from imager 70. The Miller integrator 71 includes an operational amplifier 72 having an inverting input connection from the input connection of the Miller integrator 71 and having an output connection to the output connection of the Miller integrator 71. The Miller integrator 71 includes a Miller-feedback capacitor 73 connecting from the output connection of the operational amplifier 72 to its inverting input connection. The non-inverting input connection of operational amplifier 72 receives a FILL & SPILL voltage from the timing generator 31. The FILL & SPILL voltage is normally at the enable potential, but has periodic negative pulses to implement the fill portion of a fill and spill process involving the magnitude capacitors in the processors 40 etc. During intersample periods when these these negative pulses occur, the Miller-feedback capacitor 73 is selectively shunted by an MOSFET 74 conducting in response to an INTEGRATE RESET pulse applied to its gate electrode. This shunting of the capacitor 73 arranges for resetting of the Miller integrator 71 as well as selectively connecting the operational amplifier 72 as a voltage follower, causing its interconnected output connection and inverting-input connection to follow the FILL & SPILL voltage applied to its non-inverting input connection during the intersample periods to implement the fill portion of a fill and spill process involving the magnitude capacitors in the processors 40 etc.

An analog-to-digital converter 75 digitizes the analog output voltage from the Miller integrator 71 just prior to each resetting of integrator 71 and supplies the digitized imager output signal to a multiplexer 76. The multiplexer 76 routes the half-wave-rectified components of (Exp. 3) to an in-phase (I) accumulator 77 for accumulation and routes the half-wave-rectifier components of (Exp. 4) to a quadrature-phase (Q) accumulator 78 for accumulation. The accumulated (Exp. 3) and (Exp. 4) terms appear in parallel after both accumulations have been completed and address a read-only memory (ROM) 79 that stores (Exp. 5) terms. ROM 79 supplies the arc tangent of (Exp. 3) divided by (Exp. 4), as offset by 45 degrees at times that a digital latch 80 is clocked to store temporarily the sought after PHASE MEASUREMENT.

The Miller integrator 71 and analog-to-digital converter 75 have been assumed to be a part of the camera electronics 30 external to the solid state imager in camera 15. Alternatively, the Miller integrator 71 and analog-to-digital converter 75 may instead be located within the solid state imager in camera 15 transmitting the bits of the digital conversion result from the imager by respective wires, or time-division multiplexing those bits onto a single wire from the imager. Taking digital rather than analog output signal from the imager makes it easier to transmit imager output over some distance without as much problem with noise pickup degrading the signal; on the other hand, taking analog signal from the imager avoids some of the problems associated with the presence of high-speed switching signals on the imager.

Figure 6:
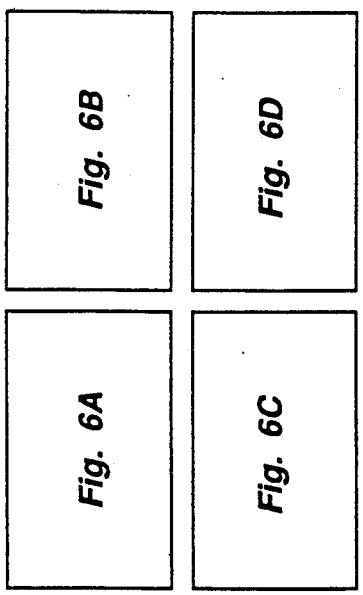
FIG. 6 is an assembly drawing showing how FIGS. 6A, 6B, 6C and 6D of the drawing are assembled to provide a representative timing diagram for the FIG. 1 apparatus for measuring phase changes in the hologram of an object field, when the FIG. 1 apparatus includes a solid state imager having on-substrate processors as shown in FIG. 4 and uses off-substrate phase calculation circuitry as shown in FIG. 5. This timing diagram in its entirety is referred to as the FIG. 6 timing diagram in the remainder of this specification.
Figure 6A:
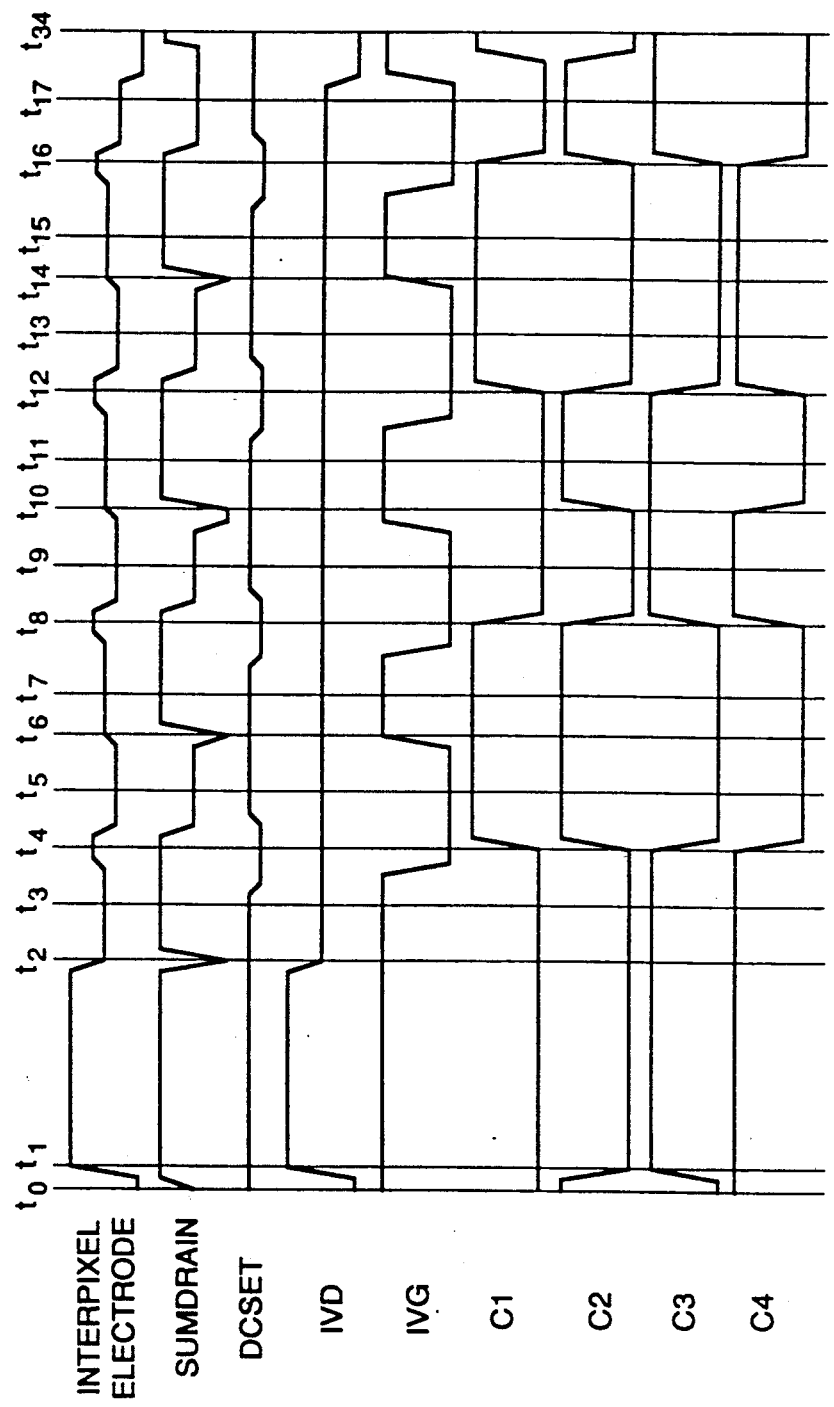
Figure 6B:
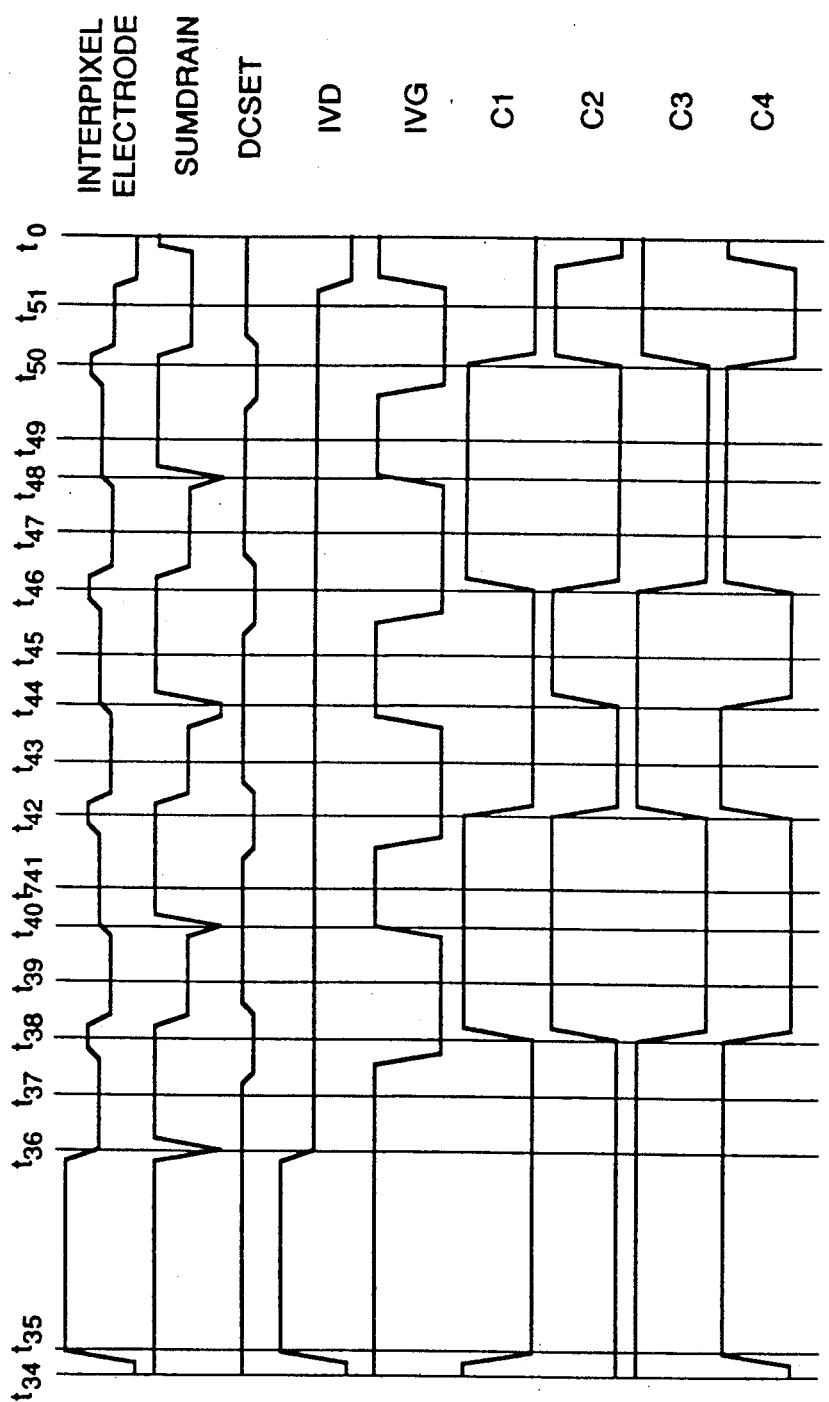
Figure 6C:
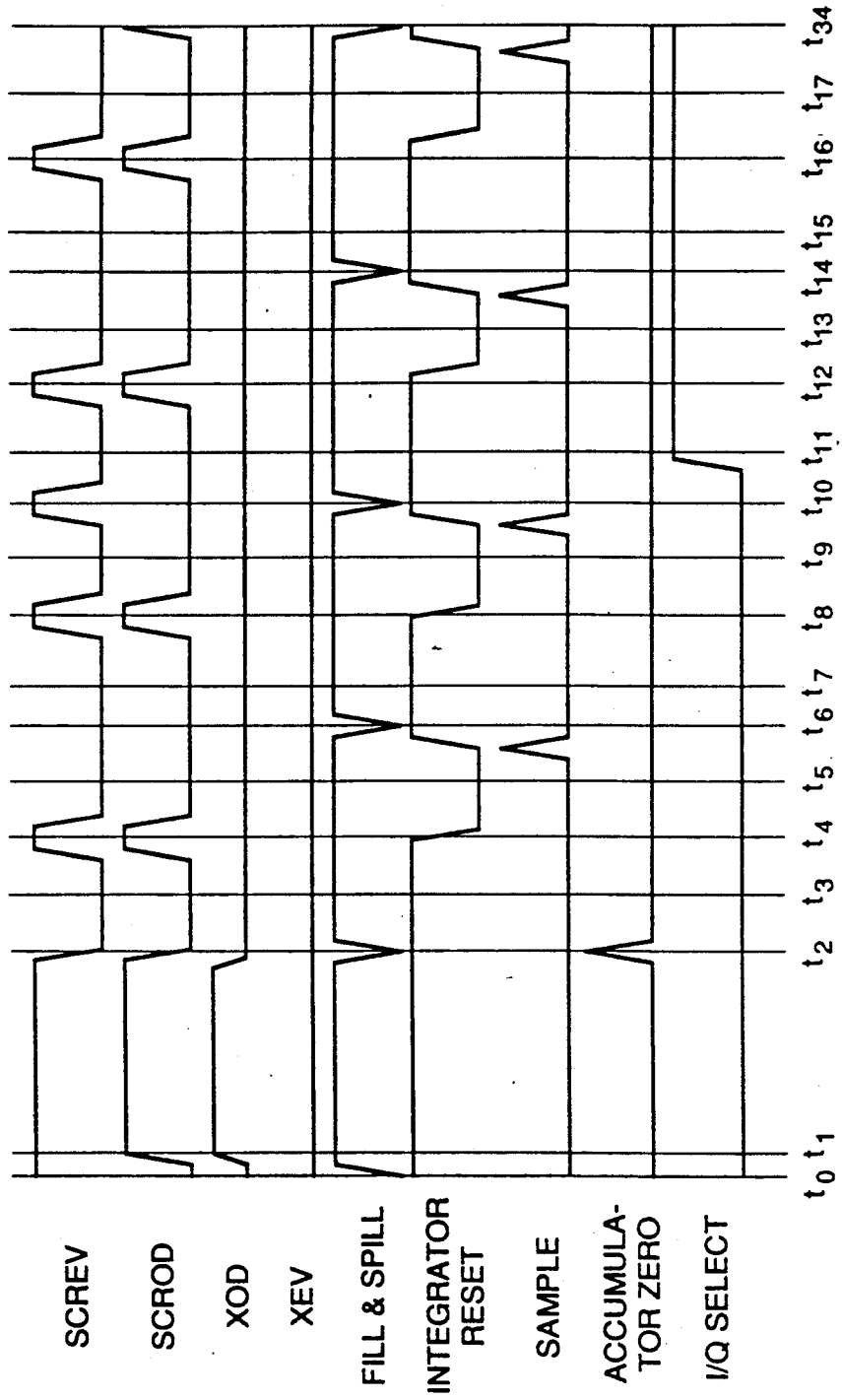
Figure 6D:
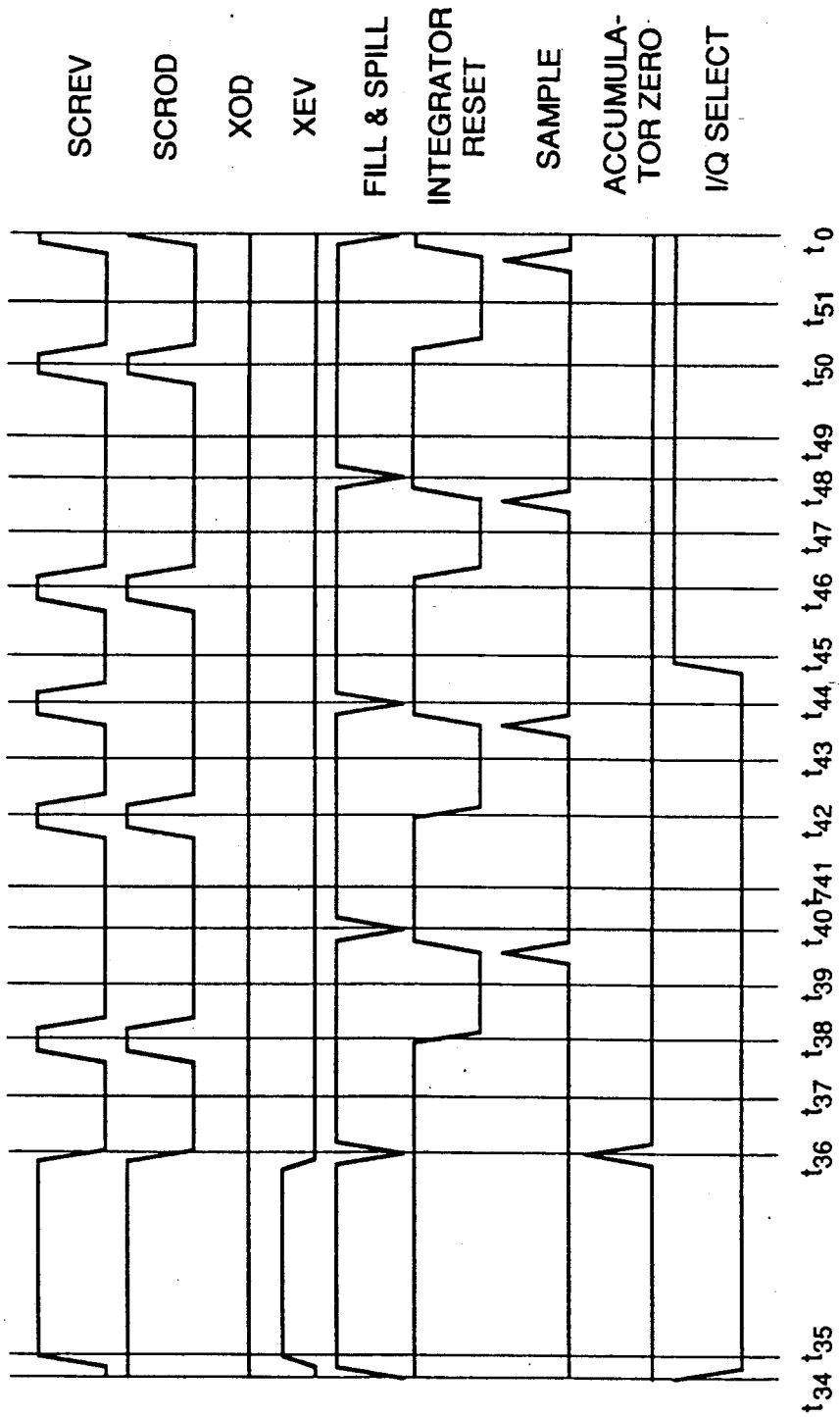
Figure 10:
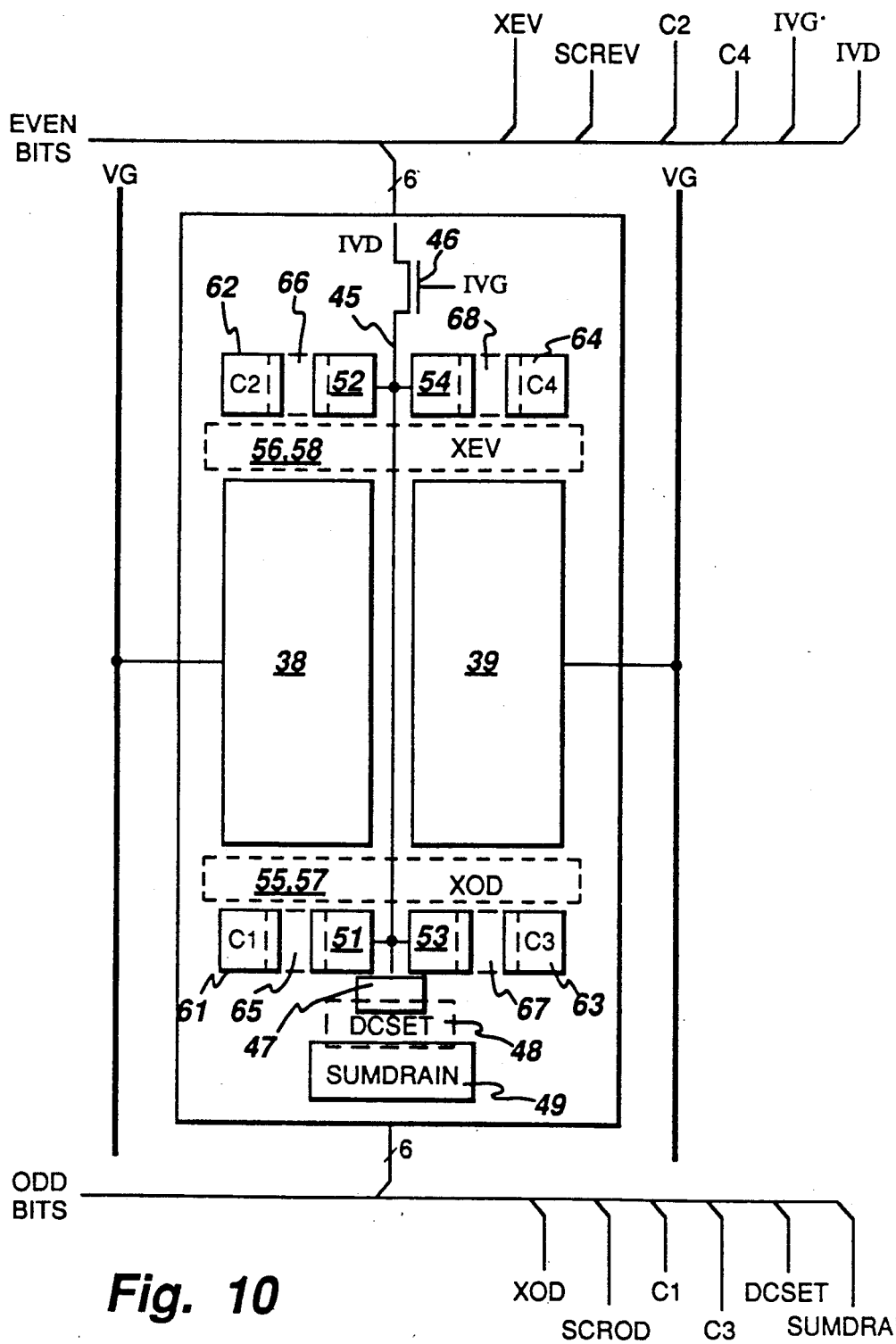
FIG. 10 is a wiring diagram for the FIG. 4 interpixel processor, giving an idea of the layout of the processor on the imager substrate.

FIGS. 4, 5 and 6A are to be referred to during the following more detailed description of the operation of the FIG. 1 optical interferometer using an imager 70 using processors like 40 and camera electronics per FIG. 5. The waveforms in the FIG. 6 timing diagram assume a bulk substrate of N type semiconductive material overlaid with an epitaxial layer of P type semiconductive material and N channel charge injection devices disposed within the epitaxial layer. That is enable voltages are positive, and disable voltages are negative.

Initially, at time $t_0$, all four charge injection devices 41, 42, 43 and 44 in each processor 40 contain charge from the two previous readout sequences. To begin the next readout sequence, charge in the odd-readout CIDs 41 and 43 is injected into the substrate (cleared). This is done by clamping the interpixel electrode 45 (and thus the electrodes 53 and 51) to disable potential with reset transistor 46 and disabling C1, C3 and SCROD. During the injection procedure, the drain potential IVD of reset transistor 46 is at disable potential, and the gate potential IVG of reset transistor 46 is at enable potential to drive reset transistor 46 channel into conduction to clamp to its drain potential IVD its source electrode and electrodes 51–54 connected thereto by the interpixel bus 45. Control voltages C2 and C4 remain enabled to allow the respective quantities of charge in the even-readout CIDs 42 and 44 to be kept in temporary storage under electrodes 62 and 64 during injection of the odd-readout CIDs 41 and 43.

After injection, at time $t_1$, in preparation for charge transfer from the photosensors 36 and 37 into CIDs 41 and 43 respectively, control voltage C3 is made high to enable electrode 63, the odd-field screen voltage SCROD is made high to enable electrodes 65 and 67, and the electrodes 51–54 (particularly 53) are enabled responsive to the interpixel electrode 45 being brought to full enable voltage. Interpixel electrode 45 is brought to full enable voltage by the reset transistor 46 being maintained in clamp by its gate voltage IVG continuing to be enabling and by its drain voltage IVD being changed to full enable voltage. The XOD voltage applied to transfer gates 55 and 57 goes high to enable them. The enablement of gates 55 and 57 transfers charge (integrated from 0 degree laser phase) from the photosensor 36 into CID 41 to repose under electrode 51 and from the photosensor 37 into CID 43 to repose electrode 63 receptive of the high control voltage C3. After the charge packet is transferred from the photosensor 36 into CID 41, it reposes under electrode 51 connecting to the interpixel bus 45 because electrode 61 is disabled by the C1 control voltage applied thereto remaining low.

At time $t_2$, the screen electrodes 65-68 are disabled by the SCROD and SCREV screen voltages going low voltage. This is done in preparation for charge transfer within CIDs 41 and 43. A fill and spill operation is then used to fill the magnitude capacitor with charge, which operation is diagrammed in FIG. 7A. At time $t_2$ the interpixel electrode 45 is clamped to one half the enable potential, by continuing an enabling IVG to keep reset transistor 46 in clamp and by setting transistor 46 drain potential IVD to one half the enable potential. The summation drain 49 is dropped in potential to fill the the magnitude capacitor under electrode 47 with charge. The dropping of summation drain 49 potential is in response to the timing generator 31 applying a relatively low FILL voltage to the non-inverting input connection of the operational amplifier 72, while the integrator reset transistor 74 is held in clamp to condition the operational amplifier 72 for operation as a voltage follower.

Thereafter during a spill period including time $t_3$ the potential on the sumdrain 49 is restored to a more positive potential. This restoration is in response to the timing generator 31 applying a relatively high SPILL voltage to the non-inverting input connection of the operational amplifier 72. During spill the gate electrode of reset transistor 46 is enabled, clamping the interpixel bus 45 to half-enable potential. Charge is held on the magnitude capacitor by maintaining a bias DCSET on the barrier electrode 47 that is negative with respect to the top plate electrode 47 of the magnitude capacitor, and thus with respect to the interpixel bus 45.

Just before the time $t_4$ the IVG signal is disabled to allow the top plate electrode 47 of the magnitude capacitor, the interpixel bus 45 and the electrodes 51-54 connected to bus 45 all to float together in potential. A charge transfer operation is then performed in the four CIDS 41-44 to allow the algebraic combination of the charge packets necessary for the calculation of Exp 1.

At time $t_4$ the screen voltage SCROD applied to electrodes 65 and 67 and the screen voltage SCREV applied to electrodes 66 and 68 both are enabled to permit charge transfer between the electrodes 61-64 receptive of the control voltages C1-C4 and respective ones of the electrodes 51-54 connecting to interpixel bus 45. At time $t_4$ electrodes 61, 62, 63, 64 are clocked $+C1, -C3, +C2, -C4$. Clocking with positive control voltages $+C1$ and $+C2$ transfers charge away from the electrodes 51 and 52 connecting to interpixel bus 45 as diagrammed in FIGS. 8A, 8B and 8C; and clocking with negative control voltages $-C3$ and $-C4$ transfers charge towards the electrodes 53 and 54 connecting to the interpixel bus 45 as diagrammed in FIGS. 9A, 9B and 9C. At time $t_4$ charge summation result calculating Exp. 1 for the particular processor 40 appears as a voltage change on its interpixel bus 45 due to the net charge difference under the electrodes 51-54 connecting thereto. After time $t_4$, the screen electrodes 65-68 are disabled. Note that the clock coupling between the screen electrodes and the interpixel bus 45 is canceled by the equal and opposite clocking of the screen electrodes 65-68 during the transfers of charge responsive the electrodes 61, 62, 63, 64 being clocked $+C1, -C3, +C2, -C4$.

FIG. 7B diagrams operation of the magnitude capacitor during an integration period including time $t_5$ when the change in the interpixel bus 45 voltage has been positive. The magnitude capacitor potential well under the electrode 47 is increased. Accordingly, no charge can flow over the potential barrier maintained by the barrier electrode.

FIG. 7C diagrams operation of the magnitude capacitor during the integration period including time $t_5$ when the change in the interpixel bus 45 voltage has been negative. The magnitude capacitor potential well under the electrode 47 is decreased. Accordingly, charge spills over the barrier potential and is sensed on the drain electrode.

The current flow on the drain of each processor in the imager is summed on the common SUMDRAIN connection which is made available at the imager interface for application to the inverting input connection of the operational amplifier 72. At time $t_5$ the integrator reset transistor 74 has been removed from clamp, to restore the capacitor 73 as a Miller feedback connection for the operational amplifier 72, conditioning the operational amplifier 72 for operation as a Miller integrator.

The total SUMDRAIN current near the end of the integration period including time $t_5$ represents the sum of the individual processor results for those processors which had negative voltage changes on their interpixel buses 45 at time $t_4$. The Miller integrator 71 response to the SUMDRAIN current near the end of the integration period including time $t_5$ is digitized by the analog-to-digital converter 75, in response to a SAMPLE pulse. The digitized SUMDRAIN current is selected by the multiplexer 76 to the in-phase accumulator 77 as a portion of the measured magnitude of Exp. 3, responsive to I/Q SELECT control signal applied to the multiplexer 76 being low.

To complete the operation of determining the magnitude of Exp. 3, it is necessary to determine the sum of the individual processor results for those processors which had positive voltage changes on their interpixel buses 45 at time $t_4$. To achieve this goal, it is necessary to move charge packets from under the electrodes 61 and 62 to under the electrodes 51 and 52 and to move charge packets from under the electrodes 53 and 54 to under the electrodes 63 and 64, then read out again. Preparatory to doing this, the fill and spill operation is repeated, with fill taking place at time $t_6$ and with spill taking time during a period including time $t_7$. During spill the gate electrode of reset transistor 46 is enabled, clamping the interpixel bus 45 to half-enable potential and the sumdrain electrode 49 is pulsed low. Then, at time $t_8$, the gate electrode of reset transistor is disabled, so interpixel bus 45 and electrodes 51-54 and 47 can float in potential; the screen voltage SCROD applied to electrodes 65 and 67 and the screen voltage SCREV applied to electrodes 66 and 68 both are enabled to permit charge transfer between the electrodes 61-64 receptive of the control voltages C1-C4 and respective ones of the electrodes 51-54 connecting to interpixel bus 45; and the four electrodes 61-64 are clocked in the opposite direction $(-C1, +C3, -C2, +C4)$ as at time $t_4$. This results in the same voltage change on the interpixel bus 45 at time $t_8$ as at time $t_4$, but with the opposite sign.

The current on the SUMDRAIN near the end of an integration period including time $t_9$ represents the sum of the individual processor results for those processors which had positive voltage changes on their respective interpixel buses 45 at time $t_4$ and have subsequently had negative voltage changes on their respective interpixel buses 45 at time $t_8$. The Miller integrator 71 response to the SUMDRAIN current at the end of the integration period including time $t_9$ is digitized by the analog-to-digital converter 75 responsive to a SAMPLE pulse applied thereto as a command signal. The digitized SUMDRAIN current at this time is selected by the multiplexer 76 to the in-phase accumulator 77 as the remaining portion of the measured magnitude of Exp. 3. The two SUMDRAIN intermediate results being accumulated in the in-phase accumulator 77 completes the calculation of Exp. 3.

To prepare for the calculation of Exp. 4, charge in the even-readout CID 42 has to be moved from under electrode 52 to under electrode 62, and charge in the even-readout CID 44 has to be moved from under electrode 64 to under electrode 54. At time $t_9$ the odd-field screen voltage SCROD has been made low to disable electrodes 65 and 67 so the charge packets under electrodes 61 and 53 will remain in place. At time $t_{10}$, the even-field screen voltage SCREV is high to enable electrodes 66 and 68; the gate electrode of reset transistor 46 is enabled to clamp interpixel bus 45 and electrodes 51-54 and 47 to the half-enable potential IVD drain voltage of reset transistor 46; the sumdrain electrode 49 is pulsed to fill the magnitude capacitor; and electrodes 62 and 64 are clocked ($+C2$, $-C4$). I/Q SELECT control signal is made high by time $t_{11}$ to condition the multiplexer 76 for the upcoming calculation of Exp. 4.

At time $t_{11}$ SRCEV is low to disable electrodes 66 and 68. The gate electrode of reset transistor 46 remains enabled to clamp interpixel bus 45 and electrodes 51-54 and 47 to the half-enable potential IVD drain voltage of reset transistor 46; and the sumdrain voltage on electrode 49 goes high as SPILL voltage is applied to the non-inverting input connection of the operational amplifier 72 conditioned to operate as a voltage follower.

Then, at time $t_{12}$, the gate electrode of reset transistor is disabled, so interpixel bus 45 and electrodes 51-54 and 47 can float in potential; the screen voltage SCROD applied to electrodes 65 and 67 and the screen voltage SCREV applied to electrodes 66 and 68 both are enabled to permit charge transfer between the electrodes 61-64 receptive of the control voltages C1-C4 and respective ones of the electrodes 51-54 connecting to interpixel bus 45; and the four electrodes 61-64 are clocked ($+C1$, $-C3$, $-C2$, $+C4$).

The total SUMDRAIN current at time $t_{13}$ represents the sum of the individual processor results for those processors which had a negative voltage change on their interpixel buses 45. The Miller integrator 71 response to the SUMDRAIN current near the end of the integration period including time $t_{13}$ is digitized by the analog-to-digital converter 75, responsive to a SAMPLE pulse. The digitized SUMDRAIN current is selected by the multiplexer 76 to the quadrature-phase accumulator 78 as a portion of the measured magnitude of Exp. 4.

To complete the operation of determining the magnitude of Exp. 4, it is necessary to determine the sum of the individual processor results for those processors which had a negative voltage change on their interpixel buses 45 at time $t_{12}$. To achieve this goal, it is necessary to move charge packets from under the electrodes 61 and 64 to under the electrodes 51 and 54 and to move charge packets from under the electrodes 52 and 53 to under the electrodes 62 and 63, then read out again. Preparatory to doing this, the fill and spill operation is repeated, with fill taking place at time $t_{14}$ and with spill taking time during a period including time $t_{15}$. During spill the gate electrode of reset transistor 46 is enabled, clamping the interpixel bus 45 to half-enable potential and the sumdrain electrode 49 is pulsed low. Then, at time $t_{16}$, the gate electrode of reset transistor is disabled, so interpixel bus 45 and electrodes 51-54 and 47 can float in potential; the screen voltage SCROD applied to electrodes 65 and 67 and the screen voltage SCREV applied to electrodes 66 and 68 both are enabled to permit charge transfer between the electrodes 61-64 receptive of the control voltages C1-C4 and respective ones of the electrodes 51-54 connecting to interpixel bus 45; and the four electrodes 61-64 are clocked ($-C1$, $+C3$, $+C2$, $-C4$) to obtain the charge summation required for completing the calculation of Exp. 4.

The current on the SUMDRAIN near the end of an integration period including time $t_{17}$ represents the sum of the individual processor results for those processors which had a positive voltage change on their respective interpixel buses 45 at time $t_{16}$. The Miller integrator 71 response to the SUMDRAIN current at time $t_{17}$ is digitized by the analog-to-digital converter 75, responsive to a SAMPLE pulse applied as a command signal. The digitized SUMDRAIN current is selected by the multiplexer 76 to the quadrature-phase accumulator 78 as the remaining portion of the measured magnitude of Exp. 4. The two SUMDRAIN intermediate results being accumulated in the quadrature-phase accumulator 78 completes the calculation of Exp. 4, and the I/Q SELECT control signal is made low to condition the multiplexer 76 for the upcoming calculation of Exp. 3.

The above sequence, consisting of charge injection on the odd-readout CIDs 41 and 43, charge transfer from the photosensors 36 and 37 and four readouts from the imager is followed by a corresponding sequence for the even-readout CIDs 42 and 44. (Times $t_{18}$ through time $t_{33}$ are not used in describing the FIG. 6 timing diagram, but are saved with times $t_{51}$ through $t_{66}$ for use in describing the FIG. 13 timing diagram.) The charge injection on the even-readout CIDs 42 and 44 takes place after time $t_{17}$, at time $t_{34}$, followed by charge transfer from the photosensors 36 and 37 to the even-readout CIDs 42 and 44 as an enabling XEV transfer pulse is applied to the transfer electrodes 56 and 58 during a time interval including time $t_{35}$. The fill and spill/charge transfer operation then proceeds at times $t_{34}$ to $t_{51}$ essentially the same way as at times $t_2$ to $t_{17}$, respectively, as previously described. The alternating of charge transfer from the photosensors to the odd-readout CIDs and to the even-readout CIDs allows two successive-in-time images to be compared, as implements the proper calculation of Exp. 3 and Exp. 4. The corresponding laser phase is changed after each XEV or XOD gate enable (0°, 90°, 0°, 90° . . . ) so that the image corresponding to the correct laser phase is generated prior to charge transfer from the photosensors.

A variant of the operation specified by the FIG. 6 timing diagram is possible in which Exp. 4 is calculated before, rather than after Exp. 3, which variant can be readily worked out by one skilled in the art and acquainted with the foregoing description of operation. Further variants of the two operational variants thusfar described are possible wherein the order of calculating the positive and negative components of Exp. 3 and/or Exp. 4 is permuted. In still further variants of the invention as thusfar described, the injection of charge packets into the substrate at times $t_0$ and $t_{34}$ may be dispensed with, instead gating the charge packets away at these times into drain structures specifically provided for this purpose. All these variants are within the scope of the invention as considered in certain of its aspects and are to be considered equivalents of each other inasfar as interpreting the scope of claims which follow this specification.

Figure 11:
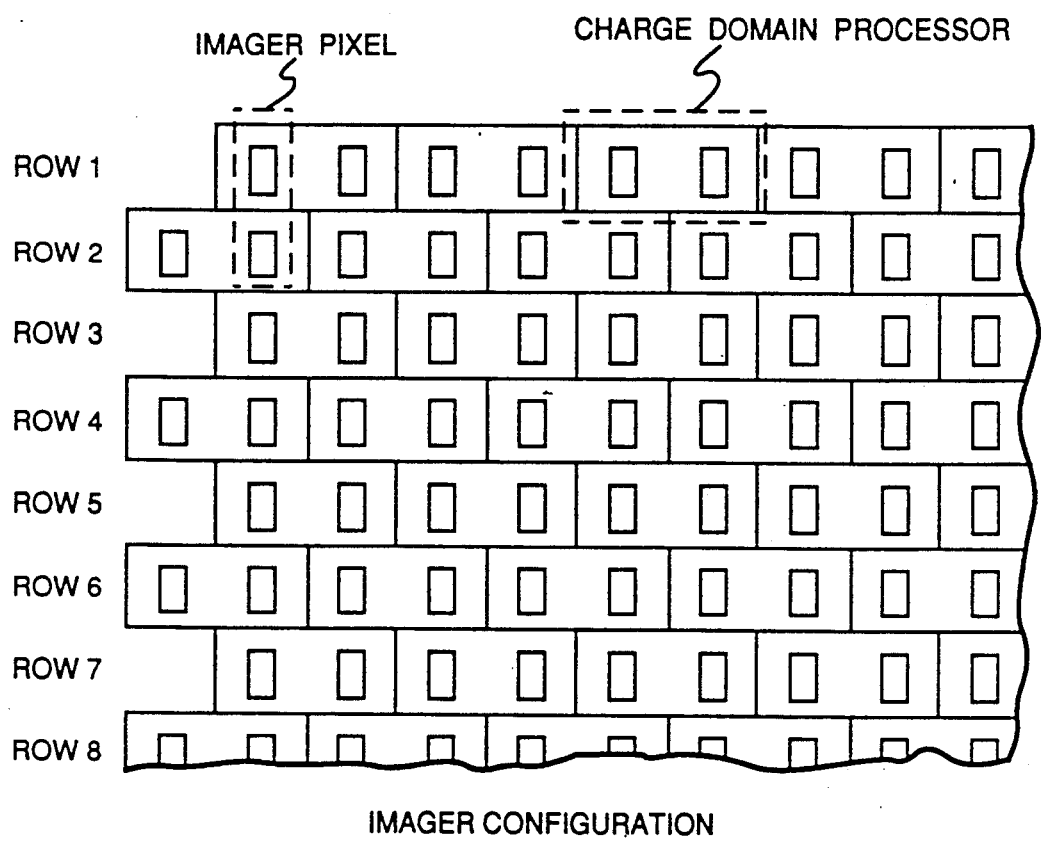
FIG. 11 shows the way in which pixel subsampling by FIG. 4 interpixel processors, as fitted between non-overlapping pairs of photosensors in a solid state imager constructed per an aspect of the invention, is preferably staggered in spatial phasing from row to row of the photosensing sites.

FIG. 11 shows the top left corner of the sensor plane of the solid stage imager 70. The left hand portions of eight rows of photosensors, ROW1, ROW2, ROW3, ROW4, ROW5, ROW6, ROW7 and ROW8 are shown. The individual photosensors are shown as smaller rectangles having widths of less extent than their heights. Non-overlapping pairs of photosensors as contained in larger rectangles having widths of greater extent than their heights share the same charge-domain processor. The processors in the odd rows ROW1, ROW3, ROW5, ROW7, differently combine adjacent pixels in non-overlapping pairs of a first spatial phasing to derive 2:1 subsampled pixel information having an average location that is staggered from the 2:1 subsampled pixel information that the processors in the even rows ROW2, ROW4, ROW6, ROW8, ... derive by differentially combining adjacent pixels in non-overlapping pairs of a second spatial phasing, staggered respective to the first spatial phasing. The row-to-row staggering of samples introduces a row-by-row alternation in spatial phasing that mitigates loss in spatial resolution in the row direction caused by the 2:1 subsampling.

Figure 12:
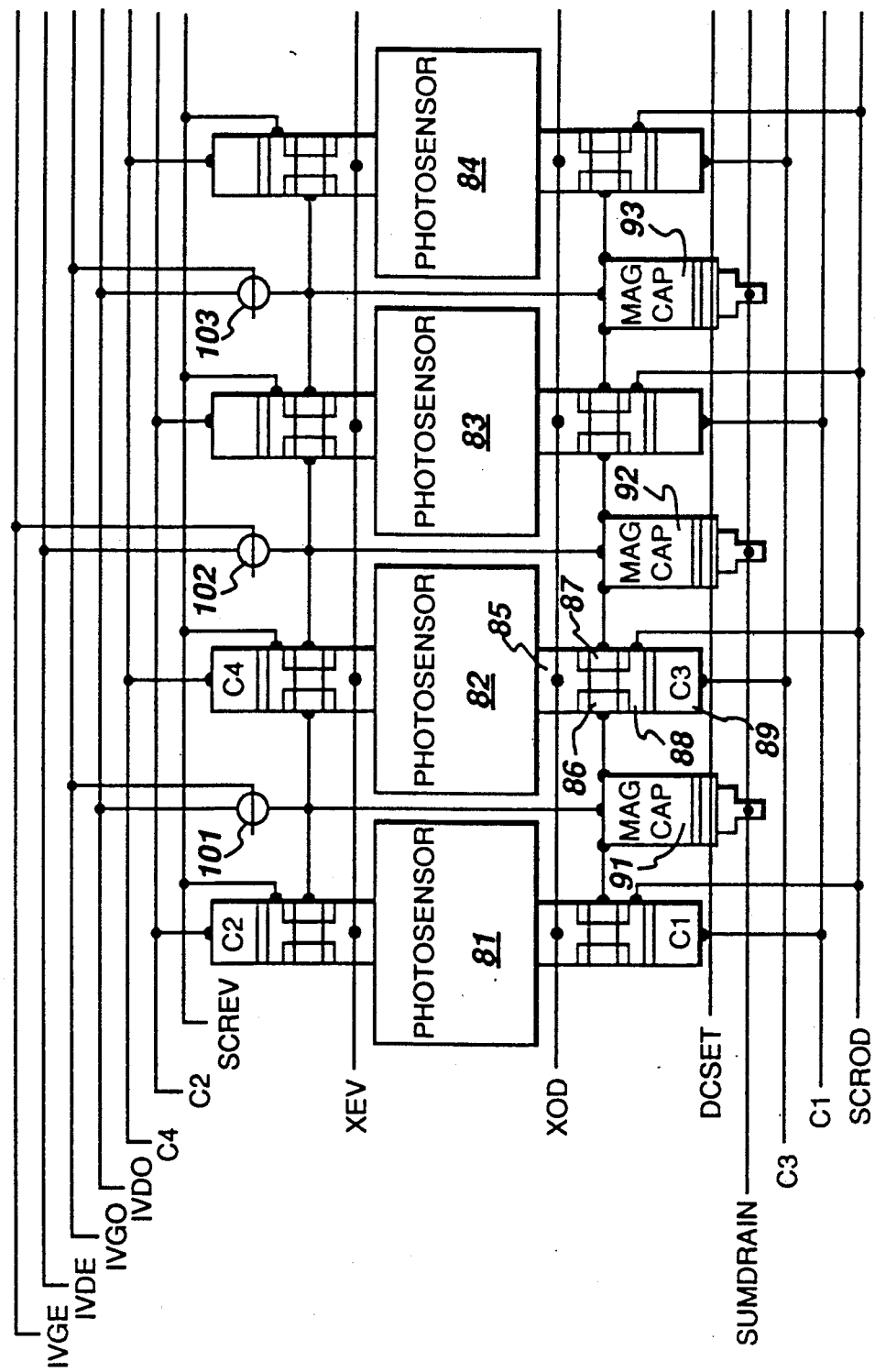
FIG. 12 shows a conceptual diagram of the layout of modified FIG. 4 interpixel processors on the substrate of another solid state imager constructed per an aspect of the invention, which modified interpixel processors fit between each overlapping pair of photosensors in rows of photosensing sites that need not have staggered spatial phasing.
Figure 13A:
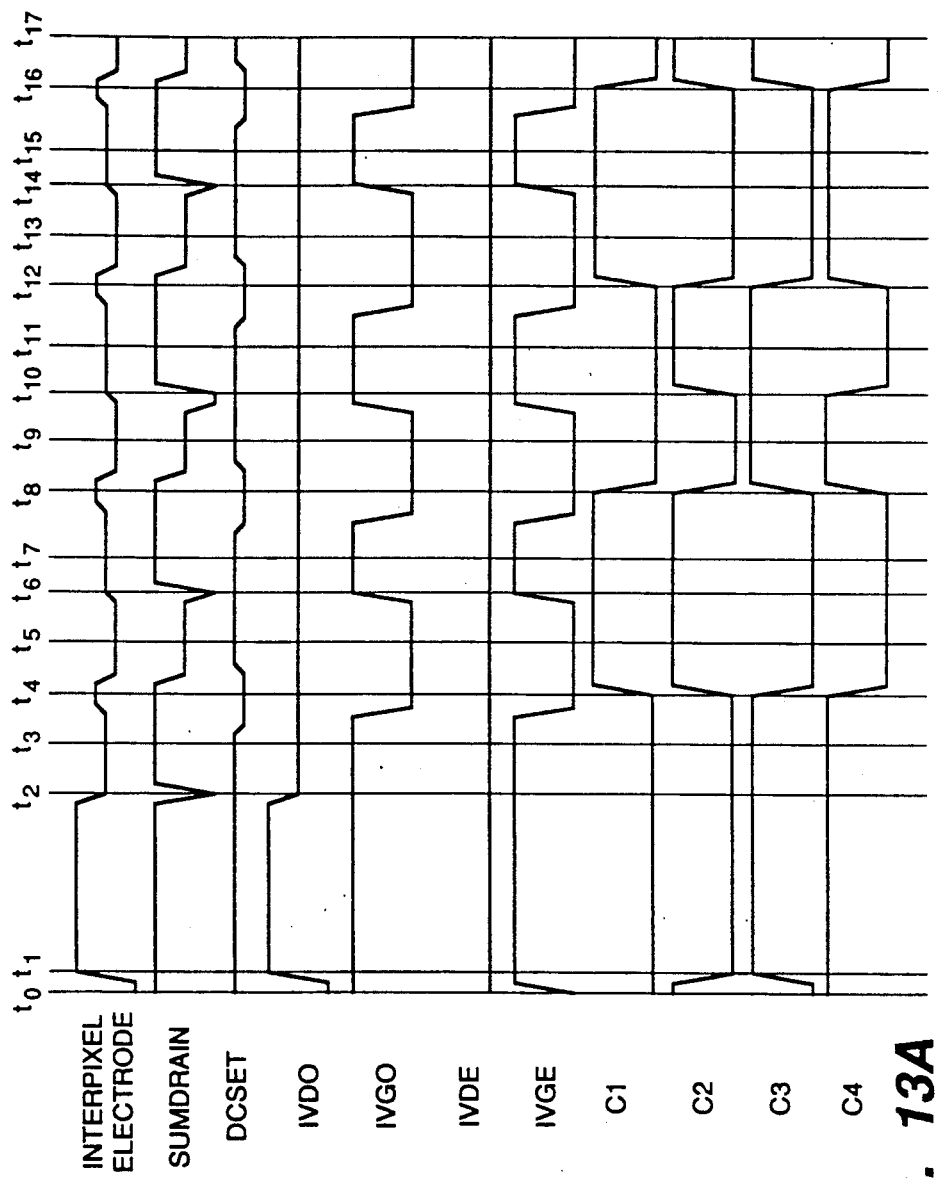
Figure 13B:
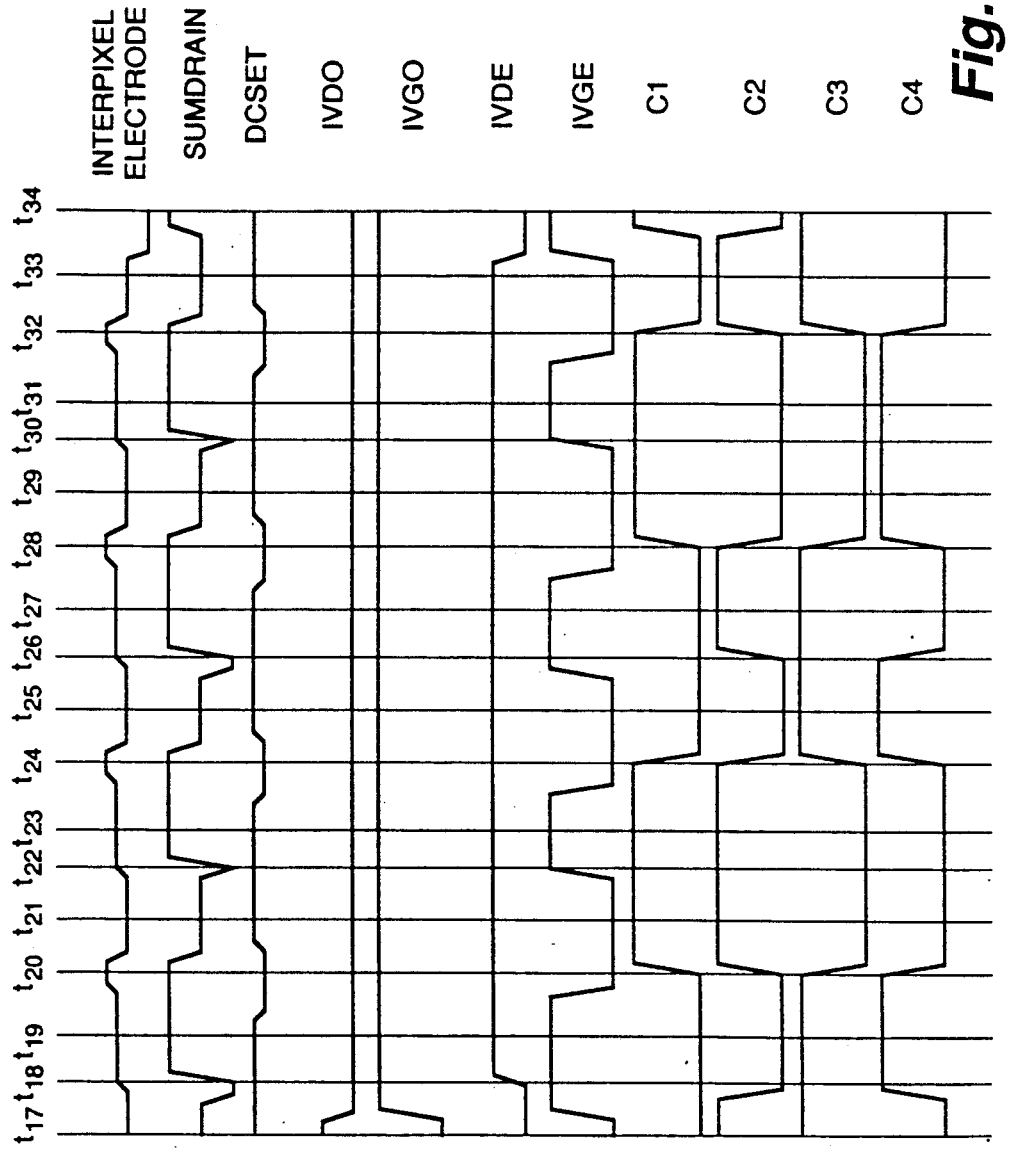
Figure 13C:
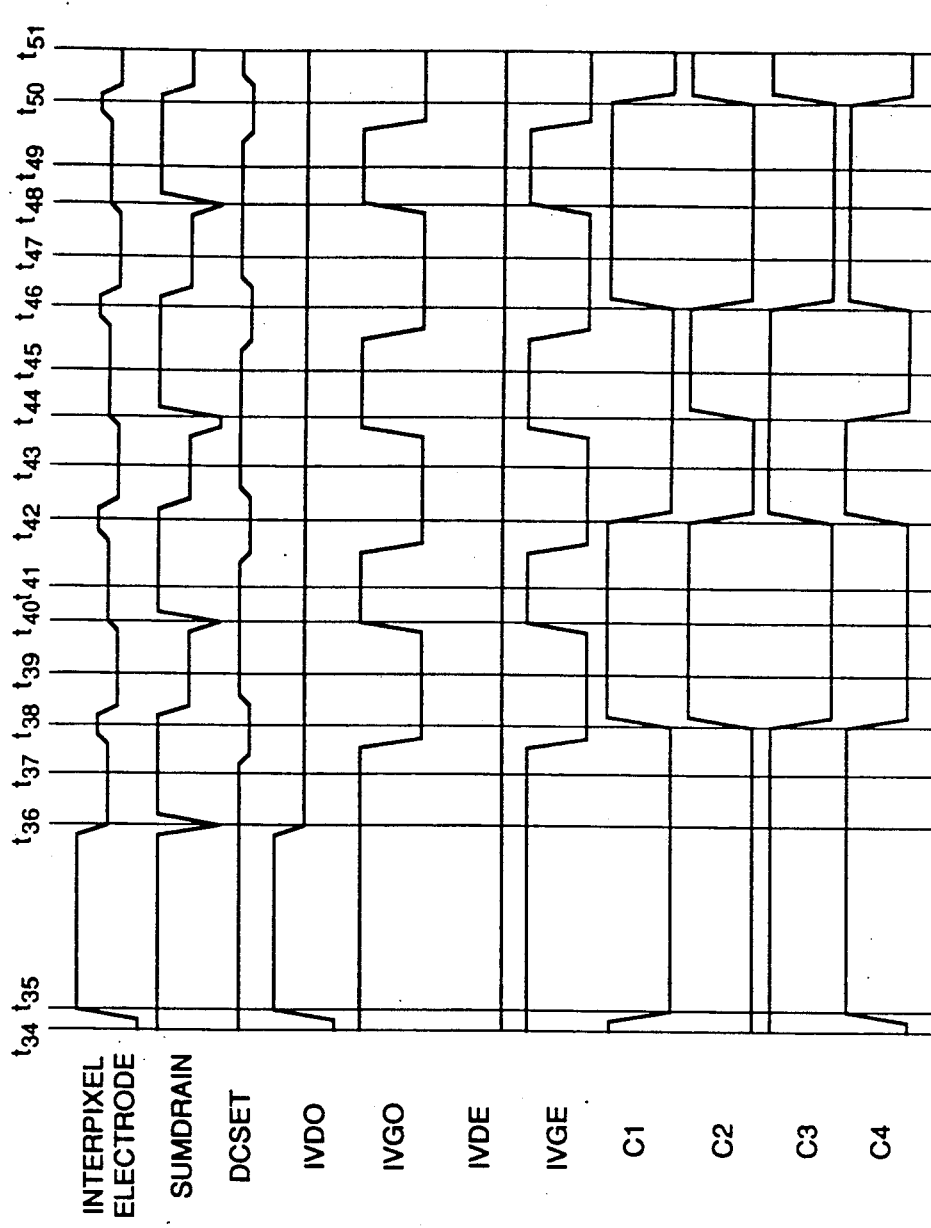
Figure 13D:
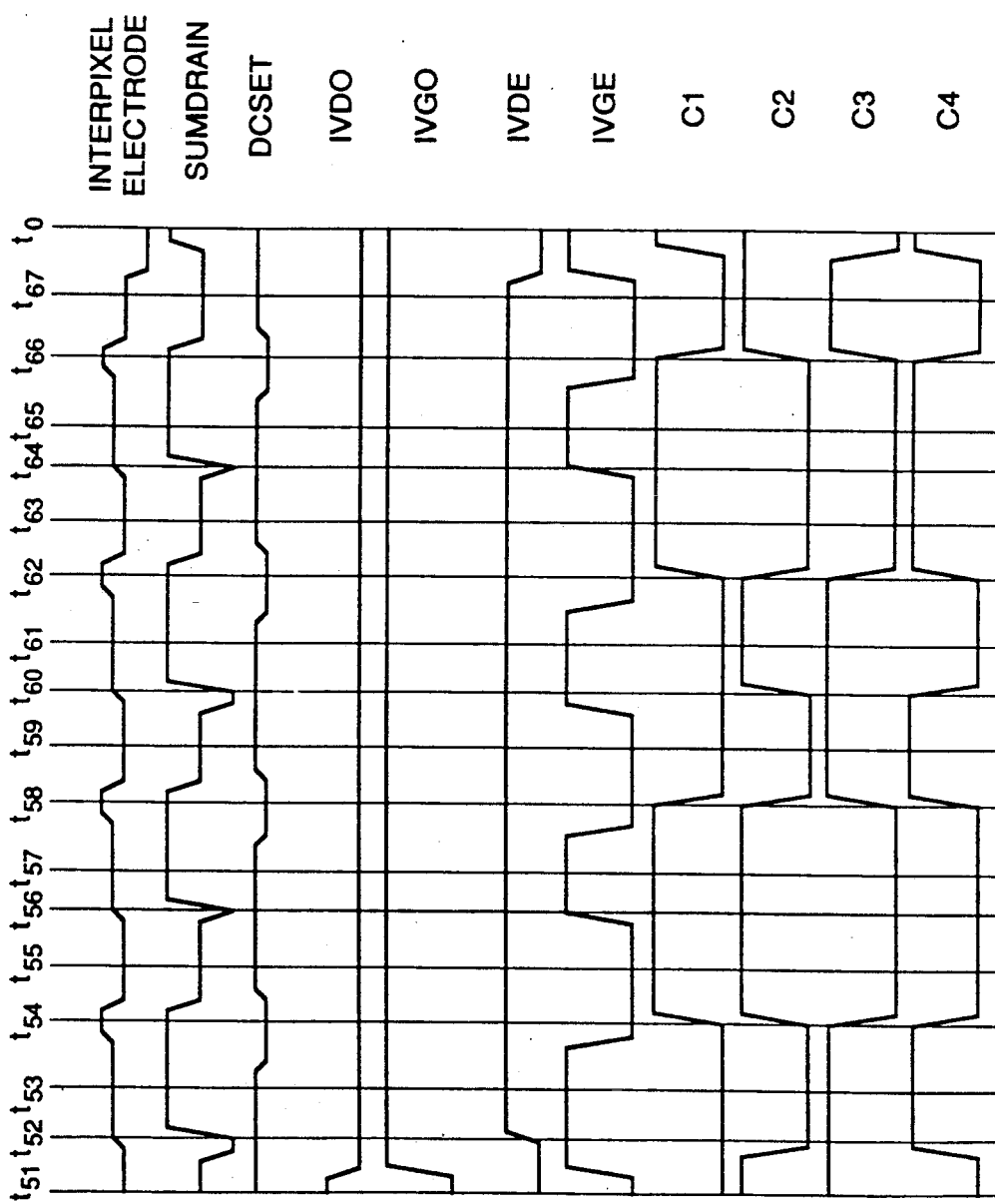
Figure 13E:
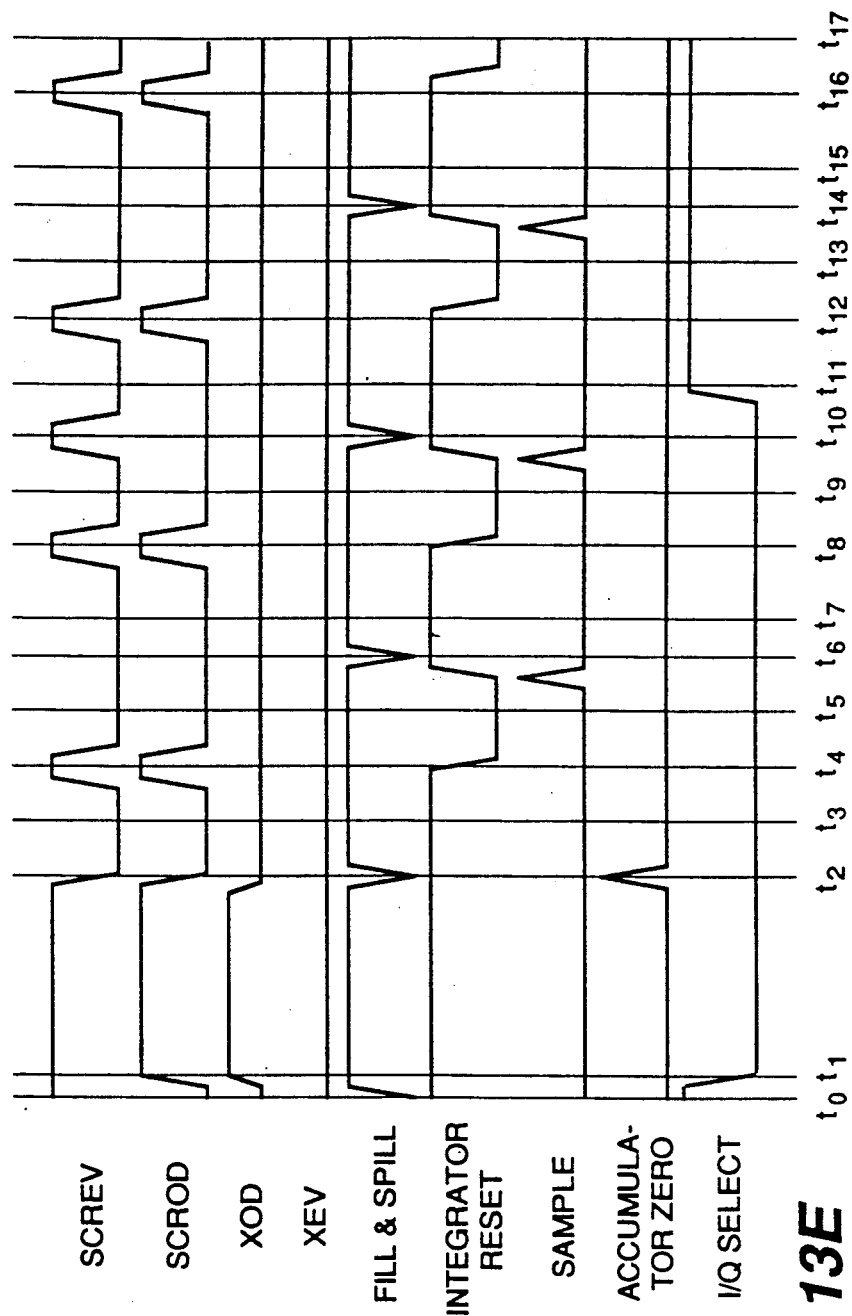
Figure 13F:
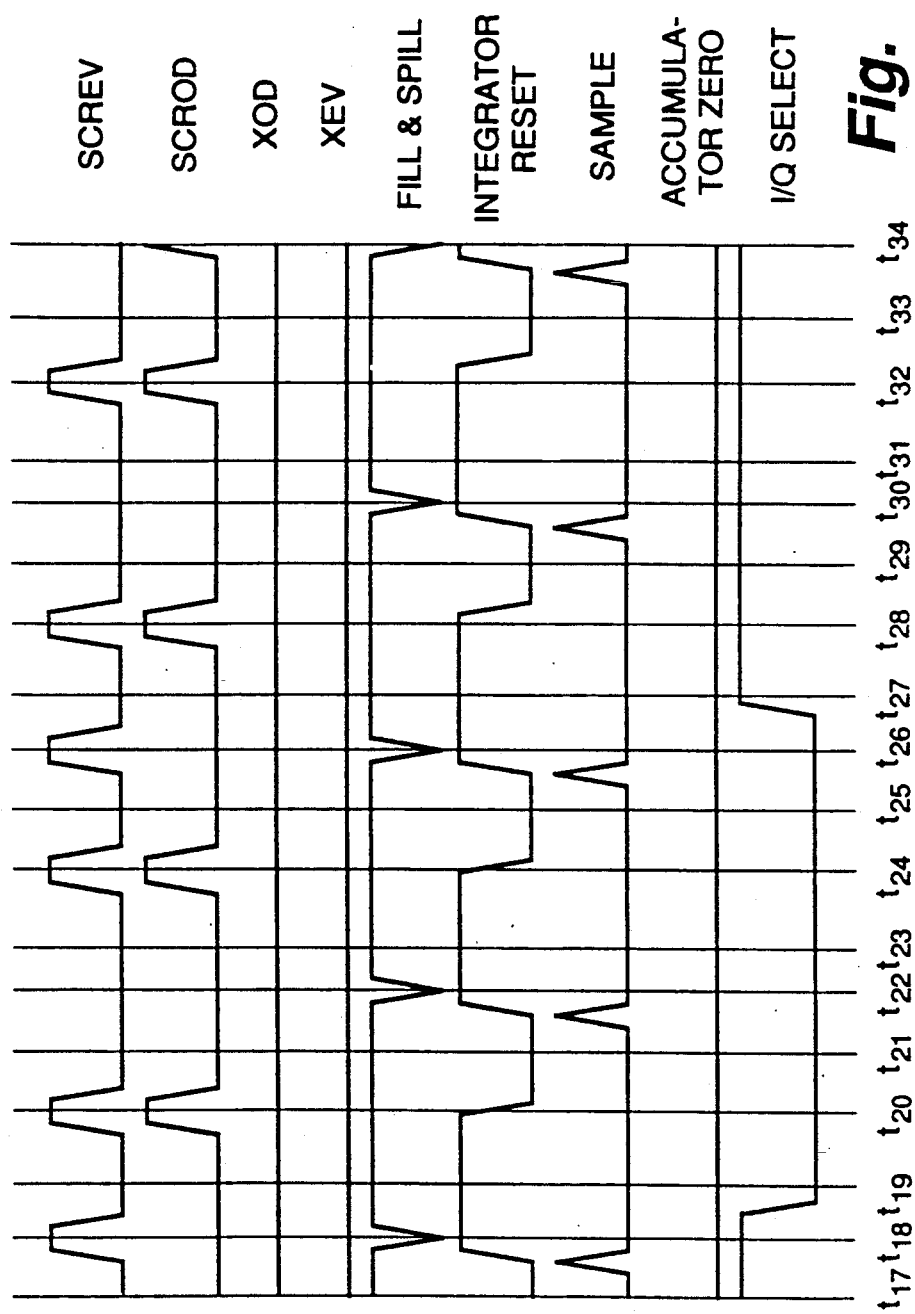
Figure 13G:
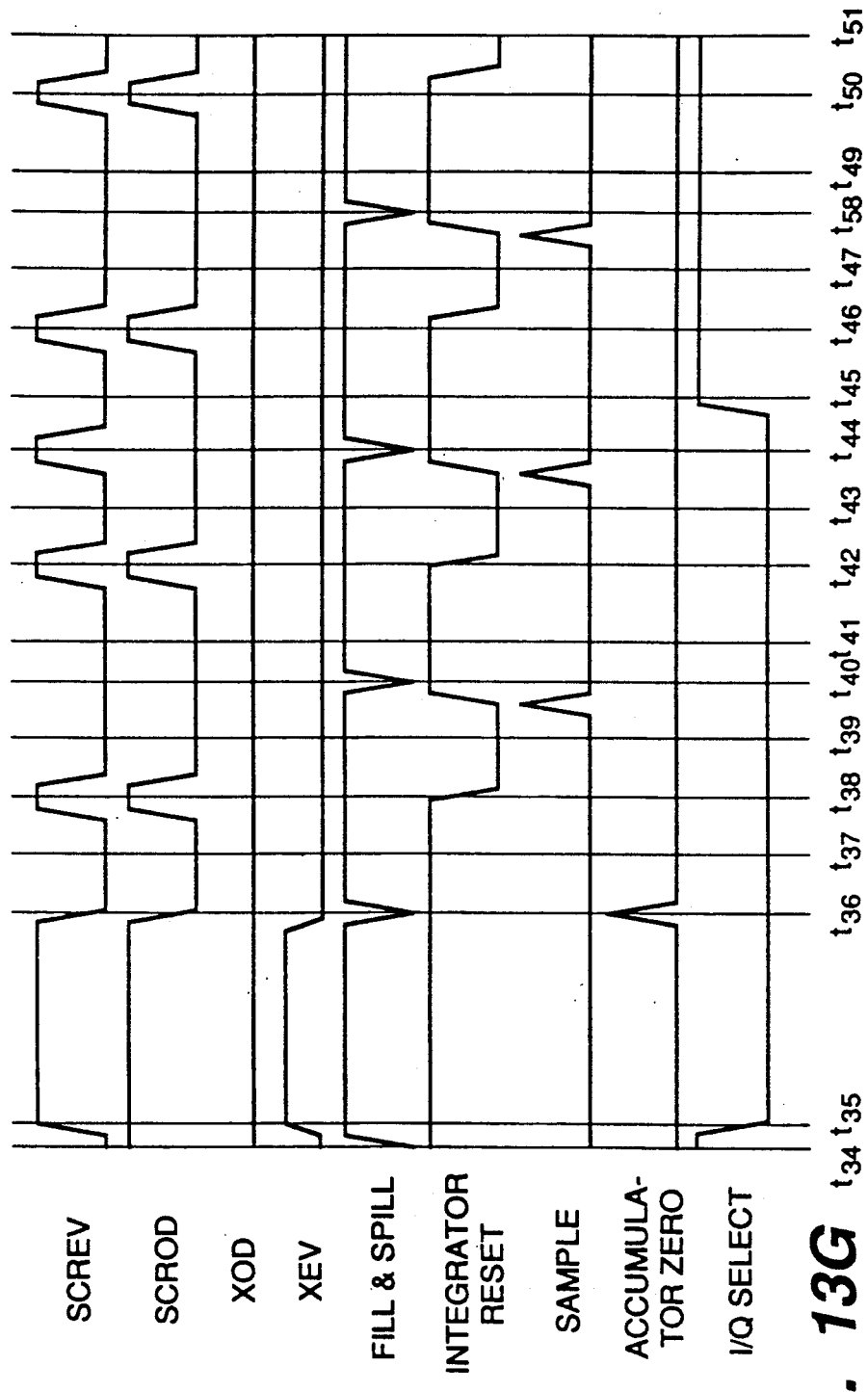
Figure 13H:
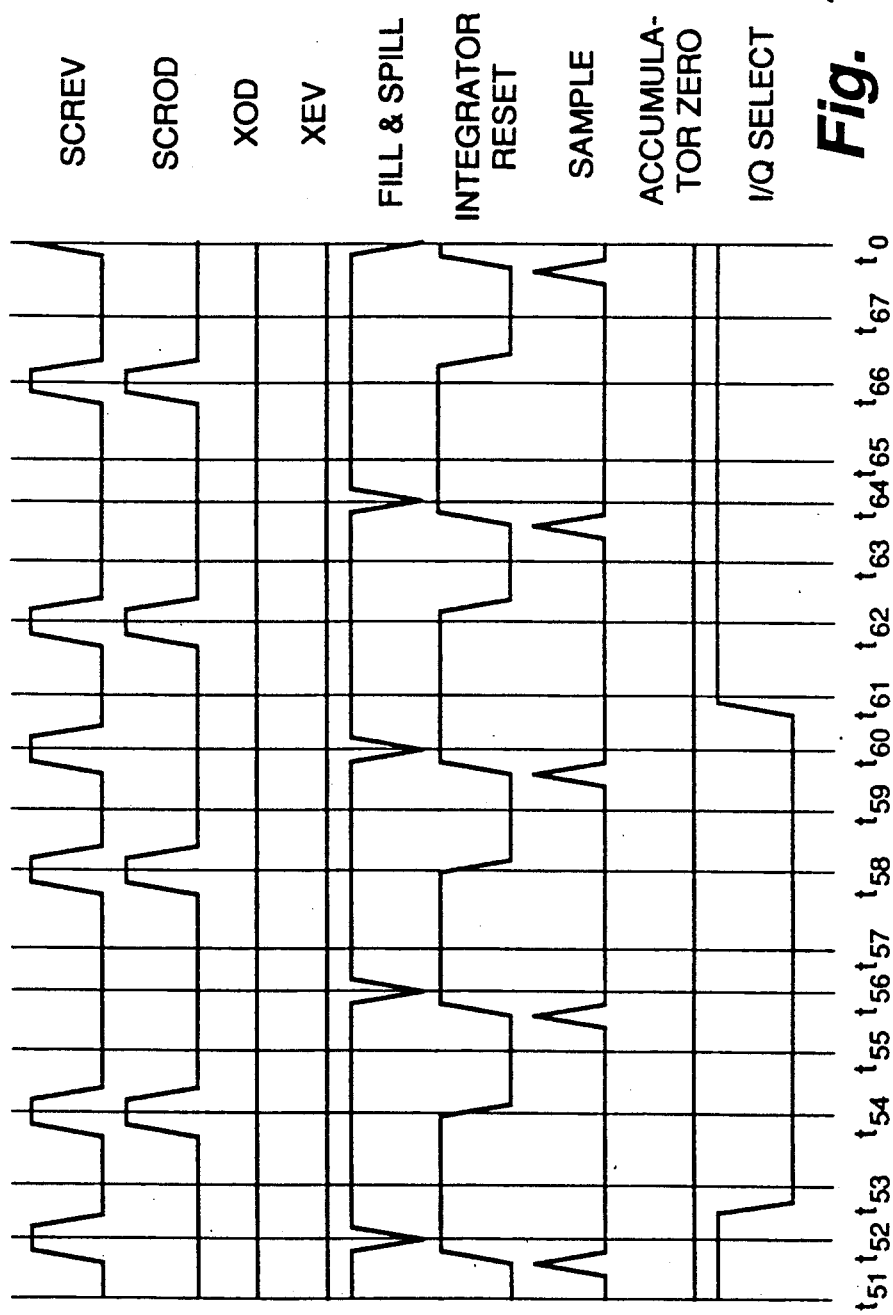

FIG. 12 illustrates how the 2:1 subsampling along row direction is avoided by differentially combining adjacent pixels in overlapping pairs, so adjacent pixels are differentially combined in both first and second spatial phasings, staggered respective to each other, to generate partial spatial correlation results. That is, two charge domain processors are provided each pixel, one processor shared with the pixel to the left and the other processor shared with the pixel to the right. A portion of a row of photosensors includes photosensors 81, 82, 83 and 84. A processor included in a first spatial phasing and shared by photosensors 81 and 82 has a magnitude capacitor 91 and a reset transistor 101; a processor included in a second spatial phasing and shared by photosensors 82 and 83 has a magnitude capacitor 92 and a reset transistor 102; and a processor included in the first spatial phasing and shared by photosensors 83 and 84 has a magnitude capacitor 93 and a reset transistor 103. The respective odd-field transfer electrode overlapping one of the photosensors 81, 82, 83 and 84 also overlaps a split electrode the halves of which respectively connect to the interpixel bus of the processor to the left of the photosensor and to the interpixel bus of the processor to the right of the photosensor. Similarly, the respective even-field transfer electrode overlapping one of the photosensors 81, 82, 83 and 84 also overlaps a split electrode the halves of which respectively connect to the interpixel bus of the processor to the left of the photosensor and to the interpixel bus of the processor to the right of the photosensor.

Consider by way of example an odd-field transfer electrode 85 overlapping the top electrode of the photosensor 82. The odd-field transfer electrode 85 also overlaps a split electrode having halves 86 and 87 connecting respectively to the top electrode of magnitude capacitor 91 and to the top electrode of magnitude capacitor 92. The split electrode having halves 86 and 87 is overlapped by an odd-field-screen electrode, which also overlaps the electrode to which C3 control voltage is applied.

Alternatively, one may view the split electrode halves 86 and 87 connecting respectively to the top electrode of magnitude capacitor 91 and to the top electrode of magnitude capacitor 92 as electrodes in two charge injection devices that have corresponding ones of their other electrodes merged together. This is the view taken in formulating certain of the claims following this specification.

Figure 13:
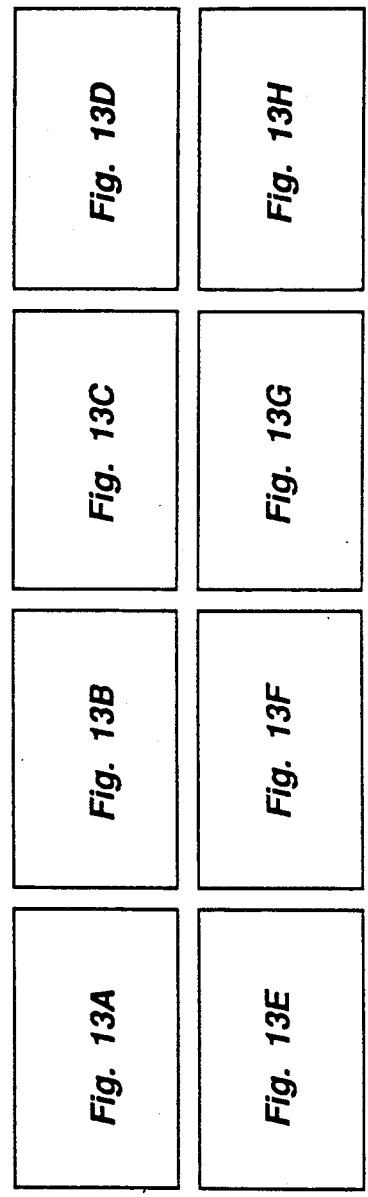
FIG. 13 is an assembly drawing showing how FIGS. 13A, 13B, 13C, 13D, 13E, 13F, 13G and 13H of the drawing are assembled to provide a representative timing diagram for the FIG. 1 apparatus for measuring phase changes in the hologram of an object field when that apparatus includes a solid state imager having on-substrate processors as shown in FIG. 12 and uses off-substrate phase calculation circuitry as shown in FIG. 5. This timing diagram in its entirety is referred to as the FIG. 13 timing diagram in the remainder of this specification. The waveforms in the FIG. 6 and FIG. 13 timing diagrams assume the designer's choice is to use N-channel devices throughout the on-substrate processors, rather than using all or some P-channel devices.

FIG. 13 timing diagram is representative of how an imager constructed in accordance with FIG. 12 is operated. Operation of the processors in the second spatial phasing during successive times including $t_0$ through differs from that in the FIG. 6 timing diagram in that the IVGE voltage applied to the gate electrodes of their respective reset transistors maintains them in clamp, to clamp the interpixel buses to which their source electrodes respectively connect to the low IVDE potential that disables the halves of the split electrodes to which these interpixel electrodes connect. All transfers of charge packets from the photosensors 81-84 etc. are thus forced to take place into the processors in the first spatial phasing during successive times including $t_0$ through $t_{17}$. Operation of the processors in the first spatial phasing during successive times including $t_0$ through $t_{17}$ is the same as that in the FIG. 6 timing diagram.

Operation of the processors in the second spatial phasing during successive times including $t_{18}$ through $t_{33}$ differs from that during successive times including $t_2$ through $t_{15}$ in the FIG. 6 timing diagram in that the IVGO voltage applied to the gate electrodes of their respective reset transistors maintains them in clamp, to clamp the interpixel buses to which their source electrodes respectively connect to the low IVDO potential that disables the halves of the split electrodes to which these interpixel electrodes connect. All transfers of charge packets from the photosensors 81-84 etc. are thus forced to take place into the processors in the second spatial phasing during successive times including $t_{18}$ through $t_{33}$. Operation of the processors in the second spatial phasing during successive times including $t_{18}$ through $t_{33}$ is the same as that during successive times including $t_2$ through $t_{17}$ in the FIG. 6 timing diagram.

Operation of the processors in the second spatial phasing during successive times including $t_{34}$ through $t_{51}$ differs from that in the FIG. 6 timing diagram in that the IVGE voltage applied to the gate electrodes of their respective reset transistors maintains them in clamp, to clamp the interpixel buses to which their source electrodes respectively connect to the low IVDE potential that disables the halves of the split electrodes to which these interpixel electrodes connect. All transfers of charge packets from the photosensors 81-84 etc. are thus forced to take place into the processors in the first spatial phasing during successive times including $t_{34}$ through $t_{51}$. Operation of the processors in the first spatial phasing during successive times including $t_{34}$ through $t_{51}$ is the same as that in the FIG. 6 timing diagram.

Operation of the processors in the second spatial phasing during successive times including $t_{52}$ through $t_{67}$ differs from that during successive times including $t_{36}$ through $t_{51}$ in the FIG. 6 timing diagram in that the IVGO voltage applied to the gate electrodes of their respective reset transistors maintains them in clamp, to clamp the interpixel buses to which their source electrodes respectively connect to the low IVDO potential that disables the halves of the split electrodes to which these interpixel electrodes connect. All transfers of charge packets from the photosensors 81-84 etc. are thus forced to take place into the processors in the second spatial phasing during successive times including $t_{52}$ through $t_{67}$. Operation of the processors in the second spatial phasing during successive times including $t_{52}$ through $t_{67}$ is the same as that during successive times including $t_{36}$ through $t_{51}$ in the FIG. 6 timing diagram.

Just as numerous variants of operation from that shown in the FIG. 6 timing diagram are possible in various embodiments of the invention, so too are numerous variants of operation from that shown in the FIG. 13 timing diagram possible in various other embodiments of the invention. Indeed, the number of possible variants of the FIG. 13 operation is larger yet, since the order of making calculations in the first and second spatial phasings can be altered to increase the number of permutations in operation that are possible, and since the calculations in the first and second spatial phasings can be performed on interleaved as well as sequential bases. All these variants are within the scope of the invention as considered in certain of its aspects and are to be considered equivalents of each other insofar as interpreting the scope of claims which follow this specification.

One skilled in the art of digital design will be aware that variations in regard to the calculation of arc tangents are possible. Calculation of Exp. 5 from a look-up table without the minus one-eighth-circle, $-\pi/2$ radian or $-45$ degree offset, then subsequently adding the offset in a digital adder, is feasible. Indeed, this procedure allows one to reduce the size of the arc tangent look-up table in ROM by taking advantage of mirror symmetry in the function. The amplitudes of the Exp. 3 and Exp. 4 terms are compared, the order these terms is permuted where necessary to always place the larger and the smaller of these terms in the same positions in the input address to the look-up table ROM; and the ROM output is selectively two's complemented depending on whether or not the Exp. 3 and Exp. 4 terms had to be permuted. Algorithms for calculating arc tangent rather than looking up from tables in ROM are possible, also, providing speed requirements on optical interferometer measurements are not too high.

One skilled in the art of solid state imager design and acquainted with the foregoing specification will be able to design a number of variants of the apparatus described and this should be borne in mind when construing the scope of the claims which follow. For example, the charge transfer devices may be either of surface-channel or buried-channel type.

What is claimed is:

1. A solid state imager for sensing shifts in the phase of a hologram fringe pattern, said solid state imager comprising:
   a bulk substrate of a semiconductor material of a first conductivity type, said bulk substrate having a first surface;
   an epitaxial layer of a semiconductor material of a second conductivity type, said epitaxial layer having a first surface forming a semiconductive junction with the first surface of said bulk sustrate and having a second surface opposed to its first surface, said second conductivity type being opposite to said first conductivity type;
   a layer of electrically insulating material having a first surface disposed against the second surface of said epitaxial layer and having a second surface opposed to its first surface;
   electrodes of electrically conductive material disposed within said layer of electrically insulating material, said electrodes being essentially planar and parallel to the first surface of said bulk substrate;
   means for making electrical connections to said electrodes via paths of electrically conductive material disposed within said layer of electrically insulating material;
   a layer of optically opaque mask material disposed against the second surface of said layer of electrically insulating material and provided with windows therethrough arranged at regular intervals in parallel rows evenly spaced apart, said layer of electrically insulating material being thin enough in the vicinity of said windows for light to pass therethrough;
   a plurality of photosensors disposed in a sensor plane along the second surface of said epitaxial layer, in spatial registration with the windows in said opaque mask, for generating respective electrical responses to impinging light;
   an improvement wherein said electrodes of electrically conductive material and said means for making electrical connections to said electrodes are configured to provide
   a first plurality of multiplier-free processors, each associated with a respective successive pair of adjacent photosensors occurring in a first spatial phasing along each of said rows, each of said first plurality of multiplier-free processors being located in said epitaxial layer near the second surface thereof in propinquity with its associated pair of adjacent photosensors so as to be shielded by said opaque mask from impinging light, said first plurality of multiplier-free processors for parallelly generating respective electrical responses descriptive of partial pixel by pixel correlations on successive fields of the responses of its associated pair of adjacent photosensors, said successive fields being identified by respective ones of consecutive ordinal numbers alternately odd and even; and
   means for combining the electrical responses of said first plurality of multiplier-free processors to generate an electrical output signal from said imager.

2. An imager as set forth in claim 1 included in apparatus for detecting at least the phase of a coherent light beam incident upon said sensor plane, said apparatus further comprising:
   means for supplying first and second wavefronts of coherent light of a first frequency to said sensor plane during odd-numbered and even-numbered ones of successive fields consecutively ordinally numbered modulo two, the first of which wavefronts is subject at least at times to variations in phasing which are to be detected, the angle between the beams of coherent light respectively making up said first and second wavefronts having an angle therebetween as causes a hologram fringe pattern on said sensor plane the fringes of which are perpendicular to said parallel rows of windows in said layer of optically opaque mask material and the wavelength of which is twice the distance between adjacent windows within any of said parallel rows;

means for selectively retarding one of said first and second wavefronts of coherent light an additional quarter wavelength during even-numbered fields; and means for further processing the electrical output signal from said imager for determining the spatial phase variations of said fringe patterns.

3. An imager as set forth in claim 1 wherein each of said first plurality of multiplier-free processors comprises:

a respective magnitude capacitor having a first plate in said substrate and a second plate formed by an electrode in said layer of electrically insulating material;

a respective magnitude capacitor having a first plate in said substrate and a second plate formed by an electrode in said layer of electrically insulating material;

a respective transistor having a source electrode connected to the second plate of said magnitude capacitor, having a drain electrode electrically connected for application of a reset potential, and having a gate electrode electrically connected for application of a magnitude-capacitor-reset signal indicative of when the second plate of said magnitude capacitor is to be clamped to said reset potential;

means for maintaining a potential barrier between said magnitude capacitor and a drain region disposed in the second surface of said epitaxial layer and included in said means for combining the electrical responses of said first plurality of multiplier-free processors to generate an electrical output signal from said imager;

a respective first charge injection device having a respective charge transfer channel in said epitaxial layer near the second surface thereof and having respective first, second, third, and fourth overlapping electrodes over its charge transfer channel, said first electrode electrically connected for application of odd-field transfer pulses thereto and operable to respond to each odd-field transfer pulse applied thereto to transfer charge from a first one of said pair of photosensors associated with that multiplier-free processor to a portion of said layer of electrically insulating material under said second electrode of that respective first charge injection device, said second electrode electrically connected to the second plate of said magnitude capacitor, said third electrode electrically connected for application of an even-field screen voltage thereto serving to isolate charges temporarily stored under said second and fourth electrodes of said first charge injection device, and said fourth electrode electrically connected for application of a first control signal voltage thereto;

a respective second charge injection device having a respective charge transfer channel in said epitaxial layer near the second surface thereof and having respective first, second, third, and fourth overlapping electrodes over its charge transfer channel, said first electrode electrically connected for application of even-field transfer pulses thereto and operable to respond to each even-field transfer pulse applied thereto to transfer charge from said first one of said pair of photosensors associated with that multiplier-free processor to a portion of said layer of electrically insulating material under said second electrode of that respective second charge injection device, said second electrode electrically connected to the second plate of said magnitude capacitor, said third electrode electrically connected for application of an odd-field screen voltage thereto serving to isolate charges temporarily stored under said second and fourth electrodes of said second charge injection device, and said fourth electrode electrically connected for application of a second control signal voltage thereto;

a respective third charge injection device having a respective charge transfer channel in said epitaxial layer near the second surface thereof and having respective first, second, third, and fourth overlapping electrodes over its charge transfer channel, said first electrode electrically connected for application of odd-field transfer pulses thereto and operable to respond to each odd-field transfer pulse applied thereto to transfer charge from a second one of said pair of photosensors associated with that multiplier-free processor to a portion of said layer of electrically insulating material under said second electrode of that respective third charge injection device, said second electrode electrically connected to the second plate of said magnitude capacitor, said third electrode electrically connected for application of an even-field screen voltage thereto serving to isolate charges temporarily stored under said second and fourth electrodes of said third charge injection device, and said fourth electrode electrically connected for application of a third control signal voltage thereto; and a respective fourth charge injection device having a respective charge transfer channel in said epitaxial layer near the second surface thereof and having respective first, second, third, and fourth overlapping electrodes over its charge transfer channel, said first electrode electrically connected for application of even-field transfer pulses thereto and operable to respond to each even-field transfer pulse applied thereto to transfer charge from said second one of said pair of photosensors associated with that multiplier-free processor to a portion of said layer of electrically insulating material under said second electrode of that respective fourth charge injection device, said second electrode electrically connected to the second plate of said magnitude capacitor, said third electrode electrically connected for application of an odd-field screen voltage thereto serving to isolate charges temporarily stored under said second and fourth electrodes of said fourth charge injection device, and said fourth electrode electrically connected for application of a fourth control signal voltage thereto.

4. Apparatus for detecting at least the phase of a coherent light beam incident upon said sensor plane, said apparatus comprising:

an imager as set forth in claim 3;

means for supplying first and second wavefronts of coherent light of a first frequency to said sensor plane during odd-numbered and even-numbered ones of successive fields consecutively ordinally numbered modulo two, the first of which wavefronts is subject at least at times to variations in phasing which are to be detected, the angle between the beams of coherent light respectively making up said first and second wavefronts having an angle therebetween as causes a hologram fringe pattern on said sensor plane the fringes of which are perpendicular to said parallel rows of windows in said layer of optically opaque mask material and the wavelength of which is twice the distance between adjacent windows within any of said parallel rows;

means for selectively retarding one of said first and second wavefronts of coherent light an additional quarter wavelength during even-numbered fields;

means for further processing the electrical output signal from said imager for determining the spatical phase variations of said fringe patterns:

means for applying said odd-field screen voltage to said imager throughout each odd field;

means for applying at the outset of each odd field a magnitude-capacitor-reset signal, a reset potential and first and third control voltages to cause injection of charge accumulated during the previous odd field into the substrate;

means for then applying one of said odd-field transfer pulses to said imager after changing said reset potential being applied to said imager, but while maintaining the application of said magnitude-capacitor-reset signal to said imager, thereby to cause transfer of charge packets accumulated by the photosensors during the preceding field interval to under the second electrodes of said first charge injection devices and said third charge injection devices respectively associated therewith;

means for maintaining the application of said magnitude-capacitor-reset signal to said imager during the remaining portion of each odd-field interval except when reading out said first, second, third and fourth charge injection devices in succession via their second electrodes to said magnitude capacitor, each successive reading out being done in a respective fill operation followed by a spill operation from said magnitude capacitor to said drain when said magnitude-capacitor-reset signal is subsequently reapplied to said imager;

means applying first, second, third and fourth control signal voltages during a first reading out of said first, second, third and fourth charge injection devices during the remaining portion of each odd-field interval, for temporarily storing charge under the second electrodes of said first and second charge injection devices and for temporarily storing charge under the fourth electrodes of said third and fourth charge injection devices;

means applying first, second, third and fourth control signal voltages during a second reading out of said first, second, third and fourth charge injection devices during the remaining portion of each odd-field interval, for temporarily storing charge under the fourth electrodes of said first and second charge injection devices and for temporarily storing charge under the second electrodes of said third and fourth charge injection devices;

means applying first, second, third and fourth control signal voltages during a third reading out of said first, second, third and fourth charge injection devices during the remaining portion of each odd-field interval, for temporarily storing charge under the second electrodes of said first and fourth charge injection devices and for temporarily storing charge under the fourth electrodes of said second and third charge injection devices;

means applying first, second, third and fourth control signal voltages during a fourth reading out of said first, second, third and fourth charge injection devices during the remaining portion of each odd-field interval, for temporarily storing charge under the second electrodes of said second and third charge injection devices and for temporarily storing charge under the fourth electrodes of said first and fourth charge injection devices;

means for applying said even-field screen voltage to said imager throughout each even field;

means for applying at the outset of each even field a magnitude-capacitor-reset signal, a reset potential and second and fourth control voltages to cause injection of charge accumulated during the previous even field into the substrate;

means for then applying one of said even-field transfer pulses to said imager after changing said reset potential being applied to said imager, but while maintaining the application of said magnitude-capacitor-reset signal to said imager, thereby to cause transfer of charge packets accumulated by the photosensors during the preceding field interval to under the second electrodes of said second charge injection devices and said fourth charge injection devices respectively associated therewith;

means for maintaining the application of said magnitude-capacitor-reset signal to said imager during the remaining portion of each even-field interval except when reading out said first, second, third and fourth charge injection devices via their second electrodes to said magnitude capacitor four successive times in a respective fill operation followed by a spill operation from said magnitude capacitor to said drain when said magnitude-capacitor-reset signal is subsequently reapplied to said imager;

means applying first, second, third and fourth control signal voltages during a first reading out of said first, second, third and fourth charge injection devices during the remaining portion of each even-field interval, for temporarily storing charge under the second electrodes of said first and second charge injection devices and for temporarily storing charge under the fourth electrodes of said third and fourth charge injection devices;

means applying first, second, third and fourth control signal voltages during a second reading out of said first, second, third and fourth charge injection devices during the remaining portion of each even-field interval, for temporarily storing charge under the second electrodes of said third and fourth charge injection devices and for temporarily storing charge under the fourth electrodes of said first and second charge injection devices;

means applying first, second, third and fourth control signal voltages during a third reading out of said first, second, third and fourth charge injection devices during the remaining portion of each even-field interval, for temporarily storing charge under the second electrodes of said first and fourth charge injection devices and for temporarily storing charge under the fourth electrodes of said second and third charge injection devices;

means applying first, second, third and fourth control signal voltages during a fourth reading out of said first, second, third and fourth charge injection devices during the remaining portion of each even-field interval, for temporarily storing charge under the second electrodes of said second and third charge injection devices and for temporarily storing charge under the fourth electrodes of said first and fourth charge injection devices;

means for digitizing the samples of the electrical output signal from said imager generated by said first, second, third and fourth readings out of said first, second, third and fourth charge injection devices during each field interval;

means, included in said means for further processing, for additively combining the digitized samples of the electrical output signal from said imager during said first and second readings out of said first, second, third and fourth charge injection devices during each field interval to generate a first absolute-value signal;

means, included in said means for further processing, for additively combining the digitized samples of the electrical output signal from said imager during said third and fourth readings out of said first, second, third and fourth charge injection devices during each field interval to generate a second absolute-value signal; and means, included in said means for further processing, responding to said first and second absolute-value signals for determining the spatial phase variations of said fringe patterns.

5. Apparatus as set forth in claim 4 wherein said first, second, third and fourth readings out of said first, second, third and fourth charge injection devices during each field interval take place in order of their ordinal numbering.

6. Apparatus as set forth in claim 4 wherein said means responding to said first and second absolute-value signals for determining the spatial phase variations of said fringe patterns comprises:

means for determining the arc tangent of said first absolute-value signal as divided by said second absolute-value signal, quantity, less a constant offset term.

7. A solid state imager for sensing shifts in the phase of a hologram fringe pattern, said soild state imager comprising:

a bulk substrate of a semiconductor material of a first conductivity type, said bulk substrate having a first surface;

an epitaxial layer of a semiconductor material of a second conductivity type, said epitaxial layer having a first surface forming a semiconductive junction with the first surface of said bulk sustrate and having a second surface opposed to its first surface, said second conductivity type being opposite to said first conductivity type;

a layer of electrically insulating material having a first surface disposed against the second surface of said epitaxial layer and having a second surface opposed to its first surface;

electrodes of electrically conductive material disposed within said layer of electrically insulating material, said electrodes being essentially planar and parallel to the first surface of said bulk substrate;

means for making electrical connections to said electrodes via paths of electrically conductive material disposed within said layer of electrically insulating material;

a layer of optically opaque mask material disposed against the second surface of said layer of electrically insulating material and provided with windows therethrough arranged at regular intervals in parallel rows evenly spaced apart, said layer of electrically insulating material being thin enough in the vicinity of said windows for light to pass therethrough; and a plurality of photosensors disposed in a sensor plane along the second surface of said epitaxial layer, in spatial registration with the windows in said opaque mask, for generating respective electrical responses to impinging light;

an improvement wherein said electrodes of electrically conductive material and said means for making electrical connections to said electrodes are configured to provide a first plurality of multiplier-free processors, each associated with a respective successive pair of adjacent photosensors occuring in a first spatial phasing along each of said rows, each of said first plurality of multiplier-free processors being located along the second surface of said epitaxial layer in propinquity with its associated pair of adjacent photosensors so as to be shielded by said opaque mask from impinging light, said first plurality of multiplier-free processors for parallelly generating respective electrical responses descriptive of partial pixel by pixel correlations on successive fields of the responses of its associated pair of adjacent photosensors, said successive fields being identified by respective ones of consecutive ordinal numbers alternately odd and even;

an improvement wherein said electrodes of electrically conductive material and said means for making electrical connections to said electrodes are configured also to provide a second plurality of multiplier-free processors each associated with a respective successive pair of adjacent photosensors occurring in a second spatial phasing along each of said rows, said first and second spatial phasings being alternative to each other, each of said second plurality of multiplier-free processors being located along the second surface of said epitaxial layer in propinquity with its associated pair of adjacent photosensors so as to be shielded by said opaque mask from impinging light, said second plurality of multiplier-free processors for parallelly generating respective electrical responses descriptive of partial pixel by pixel correlations on successive fields of the responses of its associated pair of adjacent photosensors; and means for generating an electrical output signal from said imager, at times responsive to combined electrical responses of said first plurality of multiplier-free processors, and at other times responsive to combined electrical responses of said second plurality of multiplier-free processors.

8. An imager as set forth in claim 7 included in apparatus for detecting at least the phase of a coherent light beam incident upon said sensor plane, said apparatus further comprising:

means for supplying first and second wavefronts of coherent light of a first frequency to said sensor plane during odd-numbered and even-numbered ones of successive fields consecutively ordinally numbered modulo two, the first of which wavefronts is subject at least at times to variations in phasing which are to be detected, the angle between the beams of coherent light respectively making up said first and second wavefronts having an angle therebetween as causes a hologram fringe pattern on said sensor plane the fringes of which are perpendicular to said parallel rows of windows in said layer of optically opaque mask material and the wavelength of which is twice the distance between adjacent windows within any of said parallel rows;

means for selectively retarding one of said first and second wavefronts of coherent light an additional quarter wavelength during even-numbered fields; and means for further processing the electrical output signal from said imager for determining the spatial phase variations of said fringe patterns.

9. An imager as set forth in claim 7 wherein each multiplier-free processor in said first and second pluralities of multiplier-free processors comprises:

a respective magnitude capacitor having a first plate in said substrate and a second plate formed by an electrode in said layer of electrically insulating material;

a respective transistor having a source electrode connected to the second plate of said magnitude capacitor, having a drain electrode electrically connected for application of a reset potential, and having a gate electrode electrically connected for application of a magnitude-capacitor-reset signal indicative of when the second plate of said magnitude capacitor is to be clamped to said reset potential;

means for maintaining a potential barrier between said magnitude capacitor and a drain region disposed in the second surface of said epitaxial layer and included in said means for generating an electrical output signal from said imager;

a respective first charge injection device having a respective charge transfer channel in said epitaxial layer near the second surface thereof and having respective first, second, third, and fourth overlapping electrodes over its charge transfer channel, said first electrode electrically connected for application of odd-field transfer pulses thereto and operable responsive to each odd-field transfer pulse applied thereto to transfer half the charge from said second one of said pair of photosensors associated with that multiplier-free processor to a portion of said layer of electrically insulating material under said second electrode of that respective first charge injection device, said second electrode electrically connected to the second plate of said magnitude capacitor, said third electrode electrically connected for application of an even-field screen voltage thereto serving to isolate charges temporarily stored under said second and fourth electrodes of said first charge injection device, and said fourth electrode electrically connected for application of a first control signal voltage thereto, the channel for charge transfer under said first electrode being merged with the channel for charge transfer under the first electrode of an adjoining multipler-free processor;

a respective second charge injection device having a respective charge transfer channel in said epitaxial layer near the second surface thereof and having respective first, second, third, and fourth overlapping electrodes over its charge transfer channel, said first electrode electrically connected for application of even-field transfer pulses thereto and operable responsive to each odd-field transfer pulse applied thereto to transfer half the charge from said second one of said pair of photosensors associated with that multiplier-free processor to a portion of said layer of electrically insulating material under said second electrode of that respective second charge injection device, said second electrode electrically connected to the second plate of said magnitude capacitor, said third electrode electrically connected for application of an odd-field screen voltage thereto serving to isolate charges temporarily stored under said second and fourth electrodes of said second charge injection device, and said fourth electrode electrically connected for application of a second control signal voltage thereto, the channel for charge transfer under said first electrode being merged with the channel for charge transfer under the first electrode of an adjoining multiplier-free processor;

a respective third charge injection device having a respective charge transfer channel in said epitaxial layer near the second surface thereof and having respective first, second, third, and fourth overlapping electrodes over its charge transfer channel, said first electrode electrically connected for application of odd-field transfer pulses thereto and operable responsive to each odd-field transfer pulse applied thereto to transfer half the charge from said second one of said pair of photosensors associated with that multiplier-free processor to a portion of said layer of electrically insulating material under said second electrode of that respective third charge injection device, said second electrode electrically connected to the second plate of said magnitude capacitor, said third electrode electrically connected for application of an even-field screen voltage thereto serving to isolate charges temporarily stored under said second and fourth electrodes of said third charge injection device, and said fourth electrode electrically connected for application of a third control signal voltage thereto, the channel for charge transfer under said first electrode being merged with the channel for charge transfer under the first electrode of an adjoining multipler-free processor; and a respective fourth charge injection device having a respective charge transfer channel in said epitaxial layer near the second surface thereof and having respective first, second, third, and fourth overlapping electrodes over its charge transfer channel, said first electrode electrically connected for application of even-field transfer pulses thereto and operable responsive to each odd-field transfer pulse applied thereto to transfer half the charge from said second one of said pair of photosensors associated with that multiplier-free processor to a portion of said layer of electrically insulating material under said second electrode of that respective fourth charge injection device, said second electrode electrically connected to the second plate of said magnitude capacitor, said third electrode electrically connected for application of an odd-field screen voltage thereto serving to isolate charges temporarily stored under said second and fourth electrodes of said fourth charge injection device, and said fourth electrode electrically connected for application of a fourth control signal voltage thereto, the channel for charge transfer under said first electrode being merged with the channel for charge transfer under the first electrode of an adjoining multipler-free processor.

10. An imager as set forth in claim 9 wherein each said multiplier-free processor adjoined on one side thereof by another multiplier-free processor in the same row has the first, third and fourth electrodes in its first charge injection device merged with the first, third and fourth electrodes in the first charge injection device of said adjoining on the one side other multiplier-free processor; wherein each said multiplier-free processor adjoined on said one side thereof by another multiplier-free processor in the same row has the first, third and fourth electrodes in its second charge injection device merged with the first, third and fourth electrodes in the second charge injection device of said adjoining on the one side other multiplier-free processor; wherein each said multiplier-free processor adjoined on the other side thereof by another multiplier-free processor in the same row has the first, third and fourth electrodes in its third charge injection device merged with the first, third and fourth electrodes in the third charge injection device of said adjoining on the other side other multiplier-free processor; and wherein each said multiplier-free processor adjoined on said other side thereof by another multiplier-free processor in the same row has the first, third and fourth electrodes in its fourth charge injection device merged with the first, third and fourth electrodes in the fourth charge injection device of said adjoining on the other side other multiplier-free processor.

11. Apparatus for detecting at least the phase of a coherent light beam incident upon said sensor plane, said apparatus comprising:
an imager as set forth in claim 10;
means for supplying first and second wavefronts of coherent light of a first frequency to said sensor plane during odd-numbered and even-numbered ones of successive fields consecutively ordinally numbered modulo two, the first of which wavefronts is subject at least at times to variations in phasing which are to be detected, the angle between the beams of coherent light respectively making up said first and second wavefronts having an angle therebetween as causes a hologram fringe pattern on said sensor plane the fringe of which are perpendicular to said parallel rows of windows in said layer of optically opaque mask material and the wavelength of which is twice the distance between adjacent windows within any of said parallel rows;
means for selectively retarding one of said first and second wavefronts of coherent light an additional quarter wavelength during even-numbered fields;
means for applying operating signals to the first, third and fourth electrodes of each of the first, second, third and fourth charge injection devices of each of the processors in said first plurality of processors;
means for applying operating signals to the first, third and fourth electrodes of each of the first, second, third and fourth charge injection devices of each of the processors in said second plurality of processors;
means for applying a first magnitude-capacitor-reset signal and a first reset potential signal to the gate and drain electrodes respectively of the transistor of each of the processors in said first plurality of processors;
means for applying a second magnitude-capacitor-reset signal and a second reset potential signal to the gate and drain electrodes respectively of the transistor of each of the processors in said second plurality of processors; and
means for applying fill and spill signals at selected times to said drain region disposed in the second surface of said epitaxial layer and included in said means for generating an electrical output signal from said imager.

12. Apparatus for detecting at least the phase of a coherent light beam incident upon said sensor plane, said apparatus comprising:
an imager as set forth in claim 10;
means for supplying first and second wavefronts of coherent light of a first frequency to said sensor plane during odd-numbered and even-numbered ones of successive fields consecutively ordinally numbered modulo two, the first of which wavefronts is subject at least at times to variations in phasing which are to be detected, the angle between the beams of coherent light respectively making up said first and second wavefronts having an angle therebetween as causes a hologram fringe pattern on said sensor plane the fringes of which are perpendicular to said parallel rows of windows in said layer of optically opaque mask material and the wavelength of which is twice the distance between adjacent windows within any of said parallel rows;
means for selectively retarding one of said first and second wavefronts of coherent light an additional quarter wavelength during even-numbered fields;
means for further processing the electrical output signal from said imager for determining the spatial phase variations of said fringe patterns;
means for applying said odd-field screen voltage to said imager throughout each odd field;
means for applying, at the outset of each odd field, a first magnitude-capacitor-reset signal and a first reset potential signal to the gate and drain electrodes respectively of the transistor of each of the processors in said first plurality of processors;
means for applying, at the outset of each odd field, first and third control voltages, as well as said first magnitude-capacitor-reset signal and said first reset potential signal, whereby there is injection of charge accumulated during the previous odd field into the substrate;
means for then applying one of said odd-field transfer pulses to said imager after changing said first reset potential being applied to said imager, but while maintaining the application of said first magnitude-capacitor-reset signal to said imager, thereby to cause transfer of charge packets accumulated by the photosensors during the preceding field interval to under the second electrodes of said first charge injection devices and said third charge injection devices in said first plurality of processors respectively associated therewith;

means for maintaining the application of said first magnitude-capacitor-reset signal to said imager during the remaining portion of each odd-field interval except when reading out said first, second, third and fourth charge injection devices in succession via their second electrodes to said magnitude capacitor each successive reading out being done in a respective fill operation followed by a spill operation from said magnitude capacitor to said drain when said first magnitude-capacitor-reset signal is subsequently reapplied to said imager;

means applying first, second, third and fourth control signal voltages during a first reading out of said first, second, third and fourth charge injection devices in said first plurality of processors during the remaining portion of each odd-field interval, for temporarily storing charge under the second electrodes of said first and second charge injection devices and for temporarily storing charge under the fourth electrodes of said third and fourth charge injection devices;

means applying first, second, third and fourth control signal voltages during a second reading out of said first, second, third and fourth charge injection devices in said first plurality of processors during the remaining portion of each odd-field interval, for temporarily storing charge under the fourth electrodes of said first and second charge injection devices and for temporarily storing charge under the second electrodes of said third and fourth charge injection devices;

means applying first, second, third and fourth control signal voltages during a third reading out of said first, second, third and fourth charge injection devices in said first plurality of processors during the remaining portion of each odd-field interval, for temporarily storing charge under the second electrodes of said first and fourth charge injection devices and for temporarily storing charge under the fourth electrodes of said second and third charge injection devices;

means applying first, second, third and fourth control signal voltages during a fourth reading out of said first, second, third and fourth charge injection devices in said first plurality of processors during the remaining portion of each odd-field interval, for temporarily storing charge under the second electrodes of said second and third charge injection devices and for temporarily storing charge under the fourth electrodes of said first and fourth charge injection devices;

means for applying said even-field screen voltage to said imager throughout each even field;

means for applying, at the outset of each even field, a second magnitude-capacitor-reset signal and a second reset potential signal to the gate and drain electrodes respectively of the transistor of each of the processors in said second plurality of processors;

means for applying, at the outset of each even field, first and third control voltages, as well as said second magnitude-capacitor-reset signal and said second reset potential signal, whereby there is injection of charge accumulated during the previous even field into the substrate;

means for then applying one of said even-field transfer pulses to said imager after changing said second reset potential being applied to said imager, but while maintaining the application of said second magnitude-capacitor-reset signal to said imager, thereby to cause transfer of charge packets accumulated by the photosensors during the preceding field interval to under the second electrodes of said first charge injection devices and said third charge injection devices in said second plurality of processors respectively associated therewith;

means for maintaining the application of said second magnitude-capacitor-reset signal to said imager during the remaining portion of each even-field interval except when reading out said first, second, third and fourth charge injection devices in succession via their second electrodes to said magnitude capacitor each successive reading out being done in a respective fill operation followed by a spill operation from said magnitude capacitor to said drain when said second magnitude-capacitor-reset signal is subsequently reapplied to said imager;

means applying first, second, third and fourth control signal voltages during a first reading out of said first, second, third and fourth charge injection devices in said second plurality of processors during the remaining portion of each even-field interval, for temporarily storing charge under the second electrodes of said first and second charge injection devices and for temporarily storing charge under the fourth electrodes of said third and fourth charge injection devices;

means applying first, second, third and fourth control signal voltages during a second reading out of said first, second, third and fourth charge injection devices in said second plurality of processors during the remaining portion of each even-field interval, for temporarily storing charge under the fourth electrodes of said first and second charge injection devices and for temporarily storing charge under the second electrodes of said third and fourth charge injection devices;

means applying first, second, third and fourth control signal voltages during a third reading out of said first, second, third and fourth charge injection devices in said second plurality of processors during the remaining portion of each even-field interval, for temporarily storing charge under the second electrodes of said first and fourth charge injection devices and for temporarily storing charge under the fourth electrodes of said second and third charge injection devices;

means applying first, second, third and fourth control signal voltages during a fourth reading out of said first, second, third and fourth charge injection devices in said second plurality of processors during the remaining portion of each even-field interval, for temporarily storing charge under the second electrodes of said second and third charge injection devices and for temporarily storing charge under the fourth electrodes of said first and fourth charge injection devices;

means for digitizing the samples of the electrical output signal from said imager generated by said first, second, third and fourth readings out of said first, second, third and fourth charge injection devices in said first plurality of processors during each odd field interval and in said second plurality of processors during each even field interval;

means, included in said means for further processing, for additively combining the digitized samples of the electrical output signal from said imager during said first and second readings out of said first, second, third and fourth charge injection devices in said first plurality of processors during each odd field interval and in said second plurality of processors during each even field interval, thereby to generate a first absolute-value signal during each field interval;

means, included in said means for further processing, for additively combining the digitized samples of the electrical output signal from said imager during said third and fourth readings out of said first, second, third and fourth charge injection devices in said first plurality of processors during each odd field interval and in said second plurality of processors during each even field interval, thereby to generate a second absolute-value signal during each field interval; and means, included in said means for further processing, responding to said first and second absolute-value signals for determining the spatial phase variations of said fringe patterns.

13. Apparatus as set forth in claim 12 wherein said means responding to said first and second absolute-value signals for determining the spatial phase variations of said fringe patterns comprises:

means for determining the arc tangent of said first absolute-value signal as divided by said second absolute-value signal, quantity, less a constant offset term.

* * * * *